US011719714B2

(12) United States Patent
Sarwar et al.

(10) Patent No.: US 11,719,714 B2
(45) Date of Patent: Aug. 8, 2023

(54) AUTOMATIC ANALYZER

(71) Applicants: HITACHI HIGH-TECHNOLOGIES CORPORATION, Tokyo (JP); ROCHE DIAGNOSTICS OPERATIONS, INC., Indianapolis, IN (US)

(72) Inventors: Sayaka Sarwar, Tokyo (JP); Masaharu Nishida, Tokyo (JP); Yoko Inoue, Tokyo (JP); Masafumi Shimada, Tokyo (JP); Kenichi Yagi, Tokyo (JP); Naohiko Fukaya, Tokyo (JP); Andrew McCaughey, Rotkreuz (CH)

(73) Assignees: HITACHI HIGH-TECH CORPORATION, Tokyo (JP); ROCHE DIAGNOSTICS OPERATIONS, INC., Indianapolis, IN (US)

(*) Notice: Subject to any disclaimer, the term of this patent is extended or adjusted under 35 U.S.C. 154(b) by 626 days.

(21) Appl. No.: 16/645,583

(22) PCT Filed: Mar. 19, 2019

(86) PCT No.: PCT/JP2019/011505
§ 371 (c)(1),
(2) Date: Mar. 9, 2020

(87) PCT Pub. No.: WO2019/188599
PCT Pub. Date: Oct. 3, 2019

(65) Prior Publication Data
US 2020/0264206 A1 Aug. 20, 2020

(30) Foreign Application Priority Data
Mar. 28, 2018 (JP) .................................. 2018-061199

(51) Int. Cl.
*G01N 35/10* (2006.01)
*G01N 35/00* (2006.01)

(52) U.S. Cl.
CPC .... *G01N 35/1002* (2013.01); *G01N 35/00603* (2013.01); *G01N 35/1016* (2013.01); *G01N 2035/1018* (2013.01)

(58) Field of Classification Search
CPC .......... G01N 35/1002; G01N 35/00603; G01N 35/1016; G01N 2035/1018
See application file for complete search history.

(56) References Cited

U.S. PATENT DOCUMENTS

| 2004/0034479 A1* | 2/2004 | Shimase | ............. G01N 35/1016 702/31 |
| 2007/0177778 A1* | 8/2007 | Massaro | ............. G01N 35/1016 382/128 |

(Continued)

FOREIGN PATENT DOCUMENTS

| JP | 2000074925 A | * 3/2000 | ....... G01N 35/00603 |
| JP | 2004-125780 A | 4/2004 | |

(Continued)

OTHER PUBLICATIONS

International Search Report of PCT/JP2019/011505 dated Jun. 25, 2019.

(Continued)

*Primary Examiner* — Jill A Warden
*Assistant Examiner* — John McGuirk
(74) *Attorney, Agent, or Firm* — Mattingly & Malur, PC

(57) ABSTRACT

The automatic analyzer includes: a liquid dispensing mechanism that performs suction of a liquid; a pressure sensor that measures a change of an internal pressure of a probe provided at the liquid dispensing mechanism; a determination section that determines whether the suction of the liquid (Continued)

by the probe is normal suction or air suction abnormality; an analysis section; a storage section that stores a cumulative number of times of air suction abnormality per liquid and an allowable cumulative number for the cumulative number of times of air suction abnormality; and a controller that exercises operation control over the liquid dispensing mechanism, the determination section, and the analysis section. The controller exercises control such that the cumulative number of times of air suction abnormality is updated and the updated cumulative number is stored in the storage section even if the air suction abnormality occurs non-consecutively.

6 Claims, 14 Drawing Sheets

(56) References Cited

U.S. PATENT DOCUMENTS

2010/0327012 A1    12/2010    Saegusa

2012/0036944 A1*   2/2012    Chida ................. G01N 35/026
                                                                73/863.01

FOREIGN PATENT DOCUMENTS

| JP | 2007-303937 | A |   | 11/2007 |
|----|-------------|---|---|---------|
| JP | 2009-174911 | A |   | 8/2009  |
| JP | 2009-216455 | A |   | 9/2009  |
| JP | 2012-008077 | A |   | 1/2012  |
| JP | 2014-145621 | A |   | 8/2014  |
| JP | 2015-10985  | A |   | 1/2015  |
| JP | 2015-114120 | A |   | 6/2015  |
| JP | 5865633     | B1|   | 2/2016  |
| JP | 2016-206112 | A |   | 12/2016 |
| JP | 2016206112  | A | * | 12/2016 |
| WO | 2007/129741 | A1|   | 11/2007 |

OTHER PUBLICATIONS

International Preliminary Report on Patentability received in corresponding International Application No. PCT/JP2019/011505 dated Oct. 8, 2020.

* cited by examiner

EARLIER　　　　　　　　　　DISPENSING ORDER　　　　　　　　　　LATER

| | MEASUREMENT ITEM 1 | MEASUREMENT ITEM 2 | MEASUREMENT ITEM 3 | MEASUREMENT ITEM 4 |
|---|---|---|---|---|
| CASE A | ABNORMAL SUCTION | ABNORMAL SUCTION | DISPENSING STOP | DISPENSING STOP |
| CASE B | ABNORMAL SUCTION | NORMAL SUCTION | ABNORMAL SUCTION | DISPENSING STOP |

FIG. 14

AUTOMATIC ANALYZER

TECHNICAL FIELD

The present invention relates to an automatic analyzer that includes a dispensing mechanism performing the suction of a solution such as a reagent or a specimen in a predetermined amount and delivering the solution to a reaction container.

BACKGROUND ART

An automatic analyzer for clinical laboratory tests measures a specific component in a biological sample such as a blood sample or a urine sample. General procedures of the automatic analyzer include dispensing a sample (specimen) from a sample container into a reaction container using a dedicated nozzle, and then dispensing a reagent from a reagent container into the reaction container that already contains the specimen using a dedicated nozzle. The general procedures further include, after stirring the sample and the reagent, inducing a reaction for fixed time, and making measurements by detection means in response to an absorbance and an amount of luminescence obtained from a reaction liquid.

For these procedures, if solutions such as the reagent and the specimen are not accurately dispensed in predetermined amounts, an accurate analysis result is unlikely to be obtained. It is, therefore, important for the automatic analyzer to accurately dispense the solutions such as the specimen and the reagent in the predetermined amounts.

There is known, as a method of accurately dispensing a solution in a predetermined amount, a technique for detecting a position of a liquid level, immersing a nozzle in the solution by a predetermined depth from the liquid level, and performing the suction of the solution. With this method, it is ensured that the suction of the solution starts from below the liquid level, which can prevent a variation of a suction amount due to air suction that is the suction of the air. For realizing this function, a dispensing mechanism of the automatic analyzer is normally provided with a liquid level detection mechanism that detects contact of the nozzle with the liquid level.

However, in this case, if bubbles are present on a surface of the solutiat the surface detection mechanism often, falsely detects a surface of the bubbles as the liquid level. The suction of the solution then starts from a position that is not the position of the actual liquid level, which possibly results in the occurrence of air suction, a variation of a dispensing amount, and an adverse influence on an analysis result.

For that reason, the automatic analyzer is normally configured such that a user checks bubbles or the like on a sample with eyes before the sample is mounted in the automatic analyzer to avoid analysis of the sample having the bubbles or the like.

Nevertheless, bubbles are often generated when the user is unable to sufficiently check samples with eyes in a facility where many samples are handled or when the user sufficiently checks samples with eyes and then the samples completed with the check are subjected to secondary dispensing using an automatic preprocessing system.

There are known, as a method of avoiding misdetection of bubbles causing such a shortfall in the suction amount of the solution, techniques described in Patent Documents 1 and 2.

Japanese Patent No. 5865633 describes the technique for comparing pressure data during suction detected by a pressure sensor provided in a dispensing channel with reference data during normal suction, and detecting suction abnormality.

Furthermore, Patent Document 2 describes the technique for determining whether bubbles are present at a suction position by means of picking up an image of a liquid level as a suction target, and when the bubbles are present, eliminating the bubbles by an ultrasonic wave generated by an ultrasonic generation mechanism before suction.

Moreover, Patent Document 3 describes a technique for washing a sample probe and dispensing a specimen of interest again when it is determined by a dispensing abnormality determination that suction is air suction. In addition, Patent Document 3 describes making a descent amount larger than a previous descent amount and dispensing the sample in a larger amount in the dispensing performed again, and continuing dispensing when it is determined that the suction is normal suction.

PRIOR ART DOCUMENTS

Patent Documents

Patent Document 1: Japanese Patent No. 5865633
Patent Document 2: JP-2014-145621A
Patent Document 3: JP-2004-125780A

SUMMARY OF THE INVENTION

Problem to be Solved by the Invention

According to the technique described in Japanese Patent No. 5865633, subsequent analysis of this specimen determined to have the abnormality due to the bubbles or the like is cancelled, the specimen is discharged from the automatic analyzer, and the specimen is then subjected to user's checking work and bubble elimination measures. Thereafter, it is necessary to reload the specimen into the automatic analyzer and re-test the specimen.

However, because of the contact between a nozzle and a liquid level during the suction and properties of the bubbles, the bubbles are possibly eliminated after the first suction. Owing to this, in actuality, it is often unnecessary for the specimen to be discharged from the automatic analyzer, to be subjected to the checking work, and to be reloaded into the automatic analyzer.

Furthermore, according to the technique described in JP, A2014-145621, the ultrasonic generation mechanism and an installation space for the ultrasonic generation mechanism are required in addition to the liquid level imaging means, and a massive amount of data related to image analysis is required. As a result, cost increases and it is difficult to realize the automatic analyzer at low cost.

Moreover, the technique described in JP, A2004-125780 is proposed on the premise of a case in which it is determined that predetermined abnormal suction consecutively occurs, and describes cancelling analysis of the sample for remaining analysis items and going to the dispensing of a next specimen when the air suction continues a predetermined number of times or more. According to FIG. 17 of JP, A2004-125780, it is considered that when it is determined that the suction is the normal suction at one time before the number of times of consecutive air suction reaches the predetermined number of times, count of the predetermined number of times is then reset to zero and a sample is newly dispensed. In a case of such control, even if bubbles move on a surface of the specimen after it is determined that the suction is normal suction and the sample probe contacts the bubbles to result in air suction, the count of the number of times of consecutive air suction starts again from 1. When the air suction consecutively occurs, a suction operation is repeated until the number of times of consecutive air suction reaches the predetermined number of times. In this way, for a sample for which air suction occurs discontinuously, it is better to return the specimen to the user from the analyzer earlier once and eliminate the bubbles manually. However, the suction operation is repeated until the number of times of consecutive air suction reaches the predetermined number of times whenever the air suction occurs. This possibly delays the return of the specimen to the user.

Therefore, it is an object of the present invention to realize an automatic analyzer required to accurately dispense a liquid such as a sample or a reagent in a predetermined amount, in which attention is paid to the fact that even if bubbles are detected at the surface of the liquid are then often eliminated in short time or move, an operation of the suction of the liquid is re-executed when a cumulative number of times of air suction abnormality is smaller than a predetermined allowable cumulative number, whereby it is possible to reduce user's work burden without entailing cost increase. It is another object of the present invention to realize the automatic analyzer that cancels a request planned to the liquid for measurement items, starts the operation of the suction at another liquid planned next, and returns the liquid for which the request is cancelled for the measurement items to a user as early as possible when the cumulative number of times of air suction abnormality reaches the predetermined allowable cumulative number although air suction abnormality does not occur consecutively, whereby it is possible to ensure that the user take measures quickly.

To attain the objects, the present invention is configured as follows.

An automatic analyzer includes: a liquid dispensing mechanism that performs suction of a sample or a reagent that is a liquid contained in a container; a pressure sensor that measures a change of an internal pressure of a probe provided at the liquid dispensing mechanism; a determination section that determines whether the suction of the liquid by the probe is normal suction or air suction abnormality on the basis of the change of the pressure measured by the pressure sensor; an analysis section that analyzes the sample; a storage section that stores a cumulative number of times of air suction abnormality per liquid determined by the determination section and an allowable cumulative number for the cumulative number of times of air suction abnormality, the allowable cumulative number being equal to or greater than 2; and a controller that exercises operation control over the liquid dispensing mechanism, the determination section, and the analysis section, in which the controller exercises control such that the cumulative number of times of air suction abnormality is updated and the updated cumulative number is stored in the storage section even if the air suction abnormality does not occur consecutively in a course of a suction operation of the liquid by the probe in response to a number of measurement items for the same liquid, such that the operation of the suction planned for the liquid is continued until the updated cumulative number reaches the allowable cumulative number, and such that a request planned to the liquid for measurement items is cancelled and the operation of the suction is started at another liquid planned next when the updated cumulative number reaches the allowable cumulative number.

Furthermore, an automatic analyzer includes: a liquid dispensing mechanism that performs suction of a sample or a reagent that is a liquid contained in a container and that delivers the sample or the reagent to a reaction container; a bubble determination section that determines whether bubbles are present on a surface of the liquid contained in the container; a storage section that stores a number of times of bubble determination indicating that the bubble determination section determines that the bubbles are present at the surface of the liquid contained in the same container; an analysis section that measures and analyzes the sample contained in the reaction container; and a controller that exercises operation control over the liquid dispensing mechanism, the bubble determination section, and the analysis section, in which the controller exercises control such that the liquid dispensing mechanism repeatedly executes an operation of the suction of the liquid and the bubble determination section determines again whether the bubbles are present at the surface of the liquid when the bubble determination section determines that the bubbles are present at the surface, and such that the operation of the suction of the liquid is prohibited when the number of times of bubble determination stored in the storage section is equal to or greater than an allowable cumulative number.

The present invention can realize the automatic analyzer that can improve user's operation efficiency and reduce user's work burden while preventing a reduction of throughput without entailing cost increase by re-executing the operation of the suction of the specimen when the cumulative number of times of air suction abnormality is smaller than the predetermined allowable cumulative number even with the bubbles detected at the surface. In addition, the present invention can realize the automatic analyzer that can ensure that the user take measures quickly by returning the liquid to the user as early as possible when the cumulative number of times of air suction abnormality reaches the allowable cumulative number although air suction abnormality does not occur consecutively.

BRIEF DESCRIPTION OF THE DRAWINGS

FIG. 14 shows cases in which abnormal suction occurs consecutively and not consecutively on a condition that an allowable cumulative number is 2.

MODES FOR CARRYING OUT THE INVENTION

Embodiments of the present invention will be described hereinafter in detail with reference to the drawings.

EMBODIMENTS

First Embodiment

Figure 1:
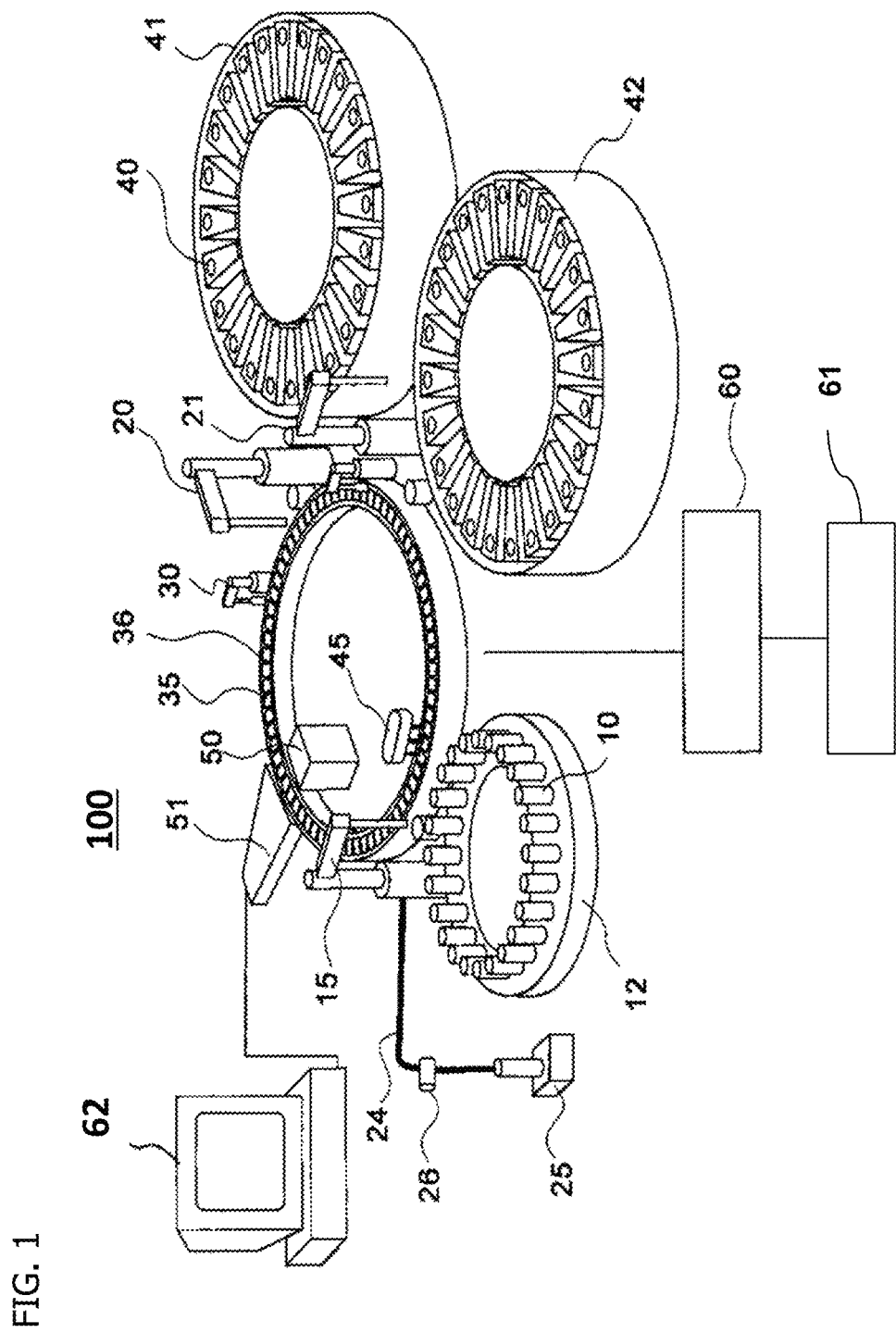
FIG. 1 is a schematic configuration diagram of an automatic analyzer to which embodiments of the present invention are applied.

An example of an automatic analyzer to which a first embodiment of the present invention is applied will be described first while FIG. 1 is taken by way of example.

FIG. 1 is a schematic configuration diagram of an automatic analyzer 100 to which the first embodiment of the present invention is applied. In FIG. 1, the automatic analyzer 100 includes a sample disk 12, a first reagent disk 41, a second reagent disk 42, and a reaction disk 36. The sample disk 12 can mount sample containers 10 each holding a sample. The first reagent disk 41 and the second reagent disk 42 can mount reagent containers 40 each containing a reagent. Reaction containers 35 are disposed on a circumference of the reaction disk 36.

The automatic analyzer 100 further includes a sample dispensing mechanism 15, a first reagent dispensing mechanism 20, a second reagent dispensing mechanism 21, a stirring device 30, a container washing mechanism 45, a light source 50, a spectral sensor 51, a computer 62, a controller 60, and a timing detection section 61.

The sample dispensing mechanism 15 includes a sample probe (dispensing probe) 16 (shown in FIG. 2) and dispenses the sample drawn in from each sample container 10 by suction into each reaction container 35 using the sample probe 16.

The first reagent dispensing mechanism 20 includes a reagent dispensing probe and dispenses the reagent drawn in from each reagent container 40 within the first reagent disk 41 by suction into each reaction container 35. Likewise, the second reagent dispensing mechanism 21 includes a reagent dispensing probe and dispenses the reagent drawn in from each reagent container 40 within the second reagent disk 42 by suction into each reaction container 35.

The stirring device 30 stirs a liquid within each reaction container 35. The container washing mechanism 45 washes each reaction container 35.

Furthermore, the light source 50 is installed near an inner circumference of the reaction disk 36 and radiates light to the reaction containers 35. The spectral sensor 51 is installed opposite to the light source 50 across the reaction containers 35 and detects the light radiated to the sample by the light source 50.

The computer 62 is connected to the spectral sensor 51 and analyzes the sample using a detection result of the spectral sensor 51. The light source 50, the spectral sensor 51, and the computer 62 configure an analysis section that measures and analyzes the sample contained in each reaction container 35.

The controller 60 controls an entire operation performed by the automatic analyzer 100. The timing detection section 61 detects operation start/stop timing of each driving mechanism and monitors a time course from operation start/stop.

The sample probe 16 of the sample dispensing mechanism 15 is connected to a proportioning pump 25 by a dispensing channel 24. A pressure sensor 26 is provided halfway along the dispensing channel 24. Although not shown in FIG. 1, the dispensing channel, the proportioning pump, and the pressure sensor are also connected to the reagent dispensing probe of the first reagent dispensing mechanism 20 and the reagent dispensing probe of the second reagent dispensing mechanism 21 in a similar manner that the dispensing channel 24, the proportioning pump 25, and the pressure sensor 26 are connected to the sample probe 16.

A sample to be tested such as a blood sample is loaded into each sample container 10 and the sample container 10 is set into the sample disk 12. Types of analysis executed on each sample are input to the controller 60. The sample obtained from one sample container 10 by the sample probe 16 of the sample dispensing mechanism 15 is dispensed into one of the reaction containers 35 arranged side by side in the reaction disk 36 in a fixed amount. A fixed amount of reagent is dispensed into each reaction container 35 from one reagent container 40 installed in the first reagent disk 41 or the second reagent disk 42 by the first reagent dispensing mechanism 20 or the second reagent dispensing mechanism 21, and stirred by the stirring device 30. Dispensing amounts of the sample and the reagent are set in advance to the controller 60 per type of analysis.

The reaction disk 36 periodically repeats rotation and stop. The spectral sensor 51 measures the light at timing at which one reaction container 35 passes in front of the light source 50. The spectral sensor 51 repeatedly measures the light for a period of ten minutes of reaction time. The container washing mechanism 45 then discharges a reaction liquid within the reaction container 35 and washes the reaction container 35. In a period in which the reaction container 35 is subjected to light measurement and washing, other reaction containers 35 are subjected to light measurement and washing in parallel using other samples and the reagent. The computer 62 calculates a concentration of a component in response to each type of analysis using data measured by the spectral sensor 51 and displays a result of calculation on a display (output section) of the computer 62.

Figure 2:
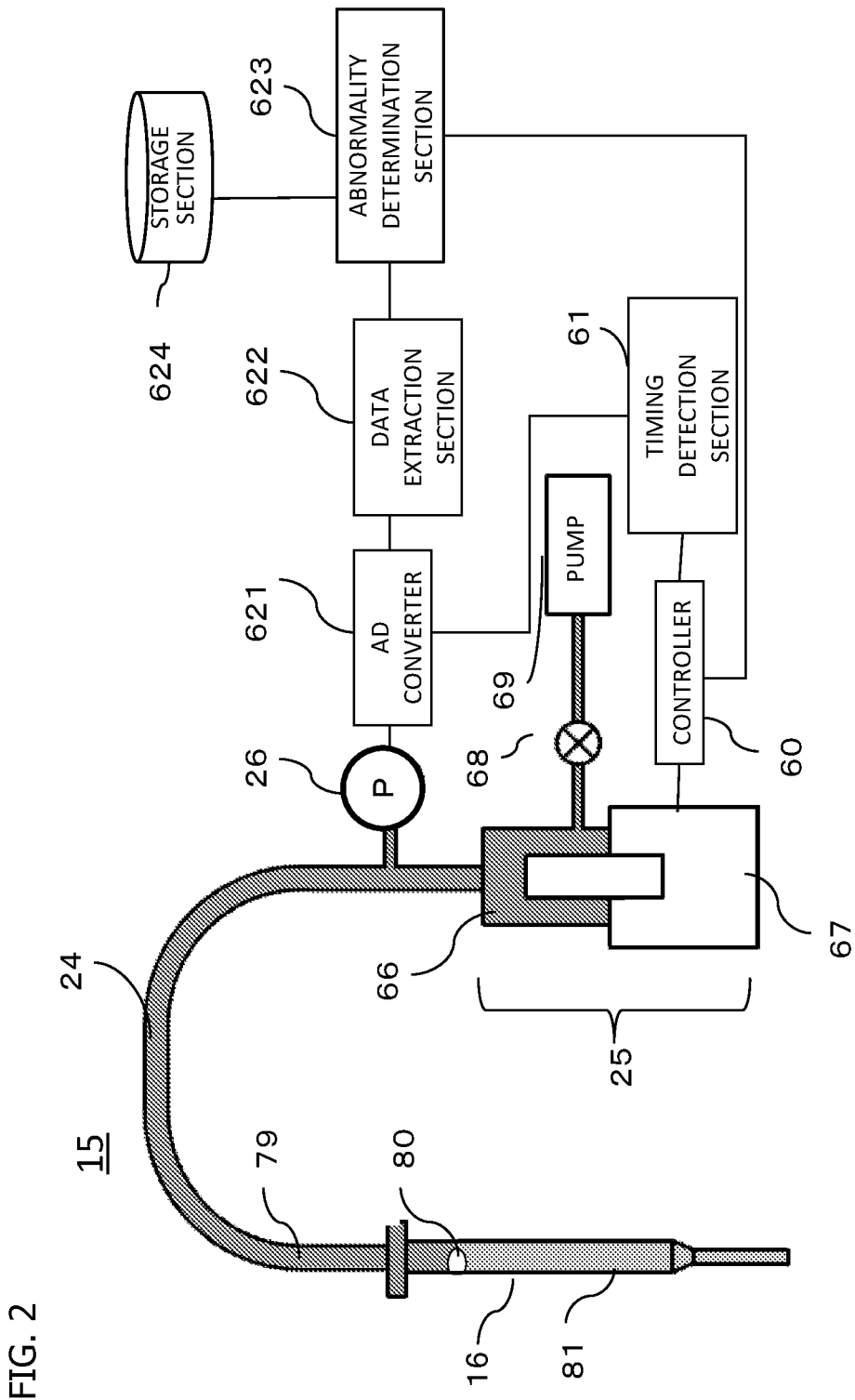
FIG. 2 shows a configuration around a sample dispensing mechanism.

FIG. 2 shows a configuration around the sample dispensing mechanism 15. The configuration around the sample dispensing mechanism 15 will now be described since the first reagent dispensing mechanism 20 and the second reagent dispensing mechanism 21 are configured similarly to the sample dispensing mechanism 15.

In FIG. 2, the proportioning pump 25 has a driving mechanism 67 and a plunger 66 and is connected to a pump 69 through a valve 68. In addition, the proportioning pump 25 is controlled by the controller 60 to perform suction and delivery of the sample. The proportioning pump 25 is connected to the sample probe 16 via the dispensing channel 24. The pressure sensor 26 is disposed between the plunger 66 and the sample probe 16 via the dispensing channel 24, and detects an internal pressure of the sample probe 16. The sample dispensing mechanism 15 is provided with a liquid level detection mechanism that detects contact of the sample probe 16 with a liquid level. When bubbles are present at the surface of the sample within the sample container 10, the liquid level detection mechanism falsely determines a surface of the bubbles as the liquid level, and the sample probe 16 performs a suction operation, the suction operation becomes so-called air suction. A change of the internal pressure of the sample probe 16 in a case of the air suction differs from that in a case in which the liquid level detection mechanism correctly determines the liquid level and the sample probe 16 performs the suction of the liquid. To address the difference, the pressure sensor 26 detects the change of the internal pressure of the sample probe 16 and the detected change of the internal pressure of the sample probe 16 is compared with a change of the internal pressure in the case of normal suction, whereby it is possible to determine whether the suction is the normal suction or abnormal suction such as the air suction.

The pressure sensor 26 is connected to an AD converter 621. The timing detection section 61 sends an instruction to the AD converter 621 such that the AD converter 621 executes digital conversion (and outputs a clock signal) at timing at which time, to be described later, passes after the proportioning pump 25 is stopped. In response to the instruction, the AD converter 621 converts analog voltage data output from the pressure sensor 26 into digital voltage data.

A data extraction section 622 receives digital data on a pressure waveform from the AD converter 621 and sends the digital data to an abnormality determination section 623. The abnormality determination section 623 determines whether air suction occurs using the data. In other words, the abnormality determination section 623 determines whether the suction of the liquid by the probe 16 is normal suction or air suction abnormality on the basis of the change of the pressure measured by the pressure sensor 26. A determination result (the number of times of bubble determination) of the abnormality determination section 623 is stored in a storage section 624. The AD converter 621, the data extraction section 622, the abnormality determination section 623, and the storage section 624 can configure, for example, part of the computer 62. In addition, the pressure sensor 26, the AD converter 621, the data extraction section 622, and the abnormality determination section 623 configure a bubble determination section. The abnormality determination section 623 in the bubble determination section can determine whether bubbles are present at the surface of the liquid contained in each sample container 10.

The sample dispensing mechanism 15 has a moving mechanism that is not shown. This moving mechanism vertically moves and rotates the sample probe 16, whereby the sample probe 16 can move to a position at which the sample probe 16 performs the suction of the sample from the sample container 10 and can move to a position at which the sample probe 16 delivers the sample to one reaction container 35.

Before the suction of the sample, the controller 60 opens the valve 68 to fill interiors of the dispensing channel 24 and the sample probe 16 with a system liquid 79 supplied from the pump 69. Next, the controller 60 controls the driving mechanism 67 to drive the plunger 66 to descend and the sample probe 16 to perform the suction of segmental air 80 in a state in which a tip end of the sample probe 16 is located in the air.

Next, the controller 60 exercises control such that the sample probe 16 descends in the sample container 10, and the plunger 66 descends in a predetermined amount in a state in which the tip end of the sample probe 16 is immersed in the sample, and the sample probe 16 performs the suction of the sample thereinto. The sample probe 16 thereby performs the suction of the sample thereinto as a suction liquid 81.

While the dispensing probe of the first reagent dispensing mechanism 20 and that of the second reagent dispensing mechanism 21 operate similarly, the suction liquid 81 in these cases is the reagent.

It is noted that the sample dispensing mechanism 15 and the reagent dispensing mechanisms 20 and 21 can be generically referred to as liquid dispensing mechanisms that perform the suction of the liquid such as the specimen or the reagent.

Figure 3:
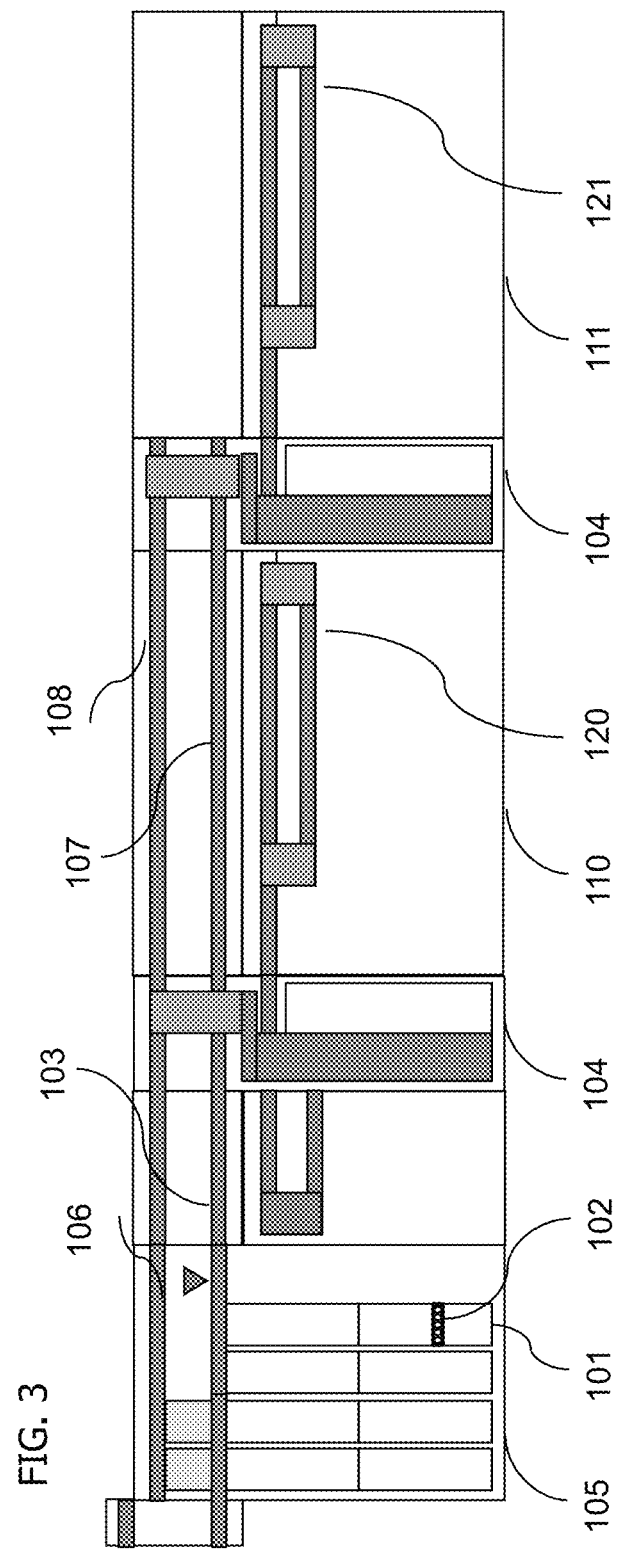
FIG. 3 is a schematic diagram showing an example of an upper surface layout of an automatic analyzer that is a combination of a plurality of analysis units.

FIG. 3 is a schematic diagram showing an example of an upper surface layout of an automatic analyzer (automatic analysis system) that is a combination of a plurality of analysis units (each including the liquid dispensing mechanisms, the bubble determination section, the storage section 624 that stores the number of times of bubble determination, the analysis section, and the controller 60 that controls the liquid dispensing mechanisms, the bubble determination section, and the analysis section).

In FIG. 3, the automatic analyzer can be configured such that analysis units measuring and analyzing the liquid for different or same measurement items are combined into one system.

It is noted that requested items are all items for which a request of measurement is issued while the measurement item is one of or each of the requested items.

One analysis unit may configure the system or a combination of a plurality of analysis units may configure the system.

Furthermore, the same specimen can be transported to and analyzed by either one of a first unit 110 and a second unit 111, or both analysis units 110 and 111 in one system.

A specimen loading section 101 is a section from which a plurality of specimen racks 102 are loaded. Each of the specimen racks 102 loaded from the specimen loading section 101 holds at least one or more sample containers (specimen containers) 10 and is transported to any of or both of the analysis units 110 and 111 via a specimen identification section 106, a transport line 103, and a lead-in line 107 in response to a status of a request of the measurement items.

Each of the specimen racks 102 transported to the analysis unit 110 is transported by a specimen transport section 120 within the analysis unit 110, and a mechanism similar to the sample dispensing mechanism 15 dispenses the specimen from each specimen container 10 held in the specimen rack 102 into the analysis section within the analysis unit 110. The analysis unit 110 includes the reagent disks 41 and 42, the reaction disk 36, the spectral sensor 51, the controller 60, the timing detection section 61, the computer 62, and the like shown in FIG. 1. It is noted, however, that the controller 60, the timing detection section 61, and the computer 62 can be provided commonly to the plurality of analysis units 110 and 111.

The specimen rack 102 finished with dispensing of the specimen is transported by the specimen transport section 120 to a specimen waiting section 104.

Each of the specimen racks 102 transported to the analysis unit 111 is transported by a specimen transport section 121 within the analysis unit 111, and a mechanism similar to the sample dispensing mechanism 15 dispenses the specimen from each specimen container 10 into the analysis section within the analysis unit 111. Like the analysis unit 110, the analysis unit 111 includes the reagent disks 41 and 42 and the like.

The specimen rack 102 finished with dispensing of the specimen is transported by the specimen transport section 121 to the specimen waiting section 104.

The specimen rack 102 finished with analysis and transported to the specimen waiting section 104 is transported to a specimen collecting section 105 by a return transport line 108.

The specimen waiting section 104 is a section in which the specimen rack 102 is made to temporarily wait until a determination result as to whether to execute an automatic re-test, to be described later, is output after the specimen rack 102 is finished with dispensing in each of the analysis units 110 and 111. It is noted that a user can make setting as to whether to execute the automatic re-test by input operation in the computer 62.

When automatic re-test setting is enabled and a request for a measurement item for which the specimen is automatically re-tested is issued, it is necessary to determine whether to execute the automatic re-test in response to a first measurement result on a predetermined condition. Owing to this, after completion of all analysis operations in response to a first request, each specimen rack 102 waits in the specimen waiting section 104 until a measurement result is output.

On the other hand, when the automatic re-test setting is disabled or the request for the measurement item for which the specimen is automatically re-tested is not issued, each specimen rack 102 is transported to the specimen collecting section 105 without waiting until the measurement result is output after completion of all analysis operations in response to the first request.

The example shown in FIG. 3 is an example of an ordinary automatic analysis system, and the system according to the first embodiment of the present invention is an example of a system provided only with one analysis unit 110 as the analysis unit.

(Case in Which Automatic Re-Test Setting is Disabled)

Figure 4:
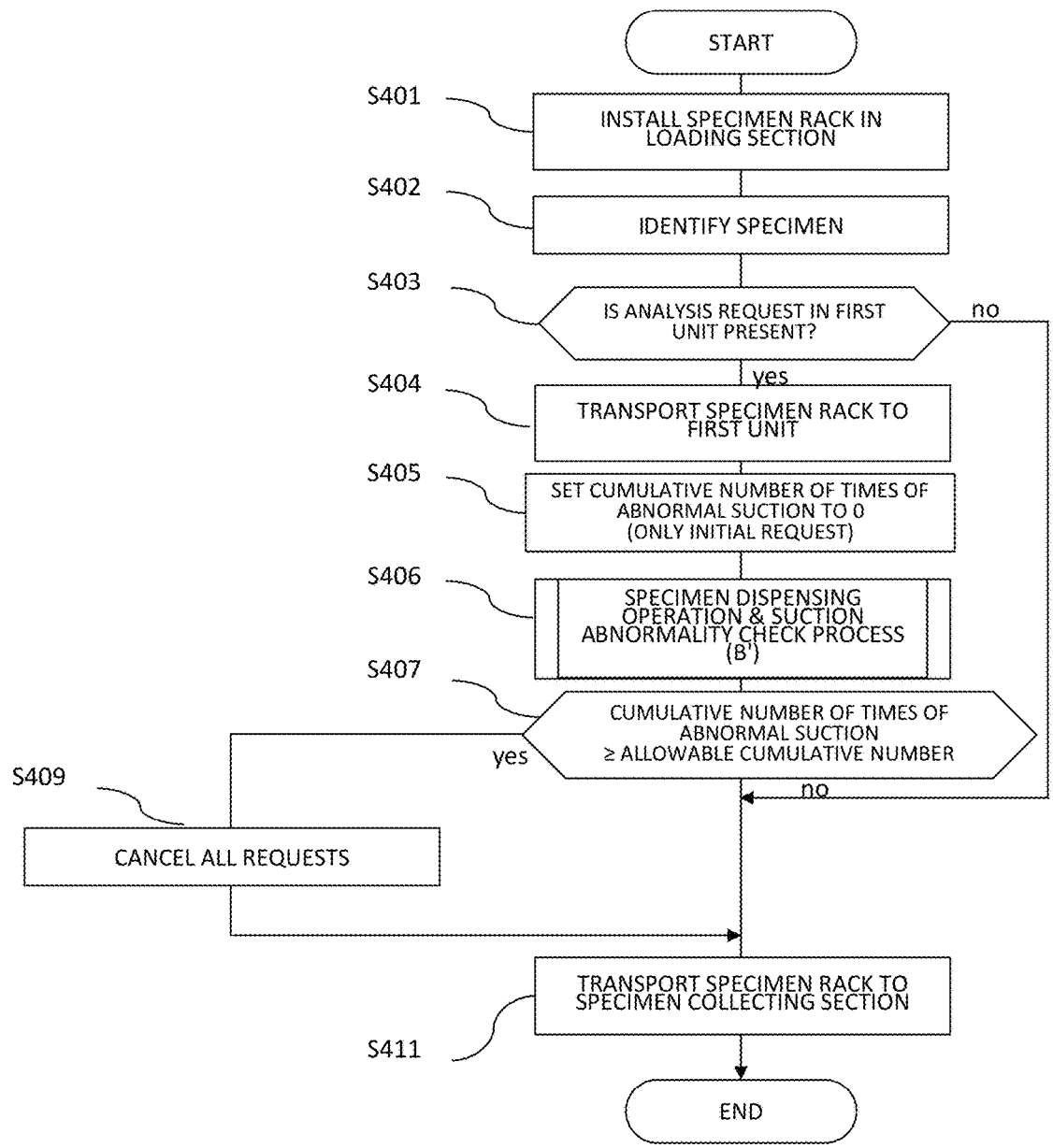
FIG. 4 is a flowchart showing an example of a flow of an abnormal-suction-check and specimen process according to a first embodiment of the present invention.

FIG. 4 is a flowchart showing an example of a flow of an abnormal-suction-check and specimen process s according to the first embodiment of the present invention, and the controller 60 exercises operation control over the flow.

As described above, the automatic analyzer according to the first embodiment is the automatic analyzer as a system configured with one analysis unit 110.

A case in which the setting of executing an automatic re-test is disabled as system setting will be described.

In FIG. 4, the specimen identification section 106 recognizes the specimen rack 102 installed in the loading section 101 (Steps S401 and S402). It is then checked whether a request for a measurement item to measure a specimen in the specimen rack 102 by the first unit 110 is present (Step S403). When the request for the measurement item to measure the specimen is present in Step S403, the specimen rack 102 is transported to the first unit 110 (Step S404).

When the request for the measurement item to measure the specimen is not present in Step S403, the specimen rack 102 is transported to the specimen collecting section 105 to end the flow (Step S411).

A cumulative number of times of abnormal suction for the specimen transported to the first unit 110 in Step S404 is set to zero (Step S405). A specimen-dispensing-operation and suction-abnormality-check process (B') is then executed (Step S406).

The specimen-dispensing-operation and suction-abnormality-check process (B') in Step S406 will now be described in detail.

Figure 5:
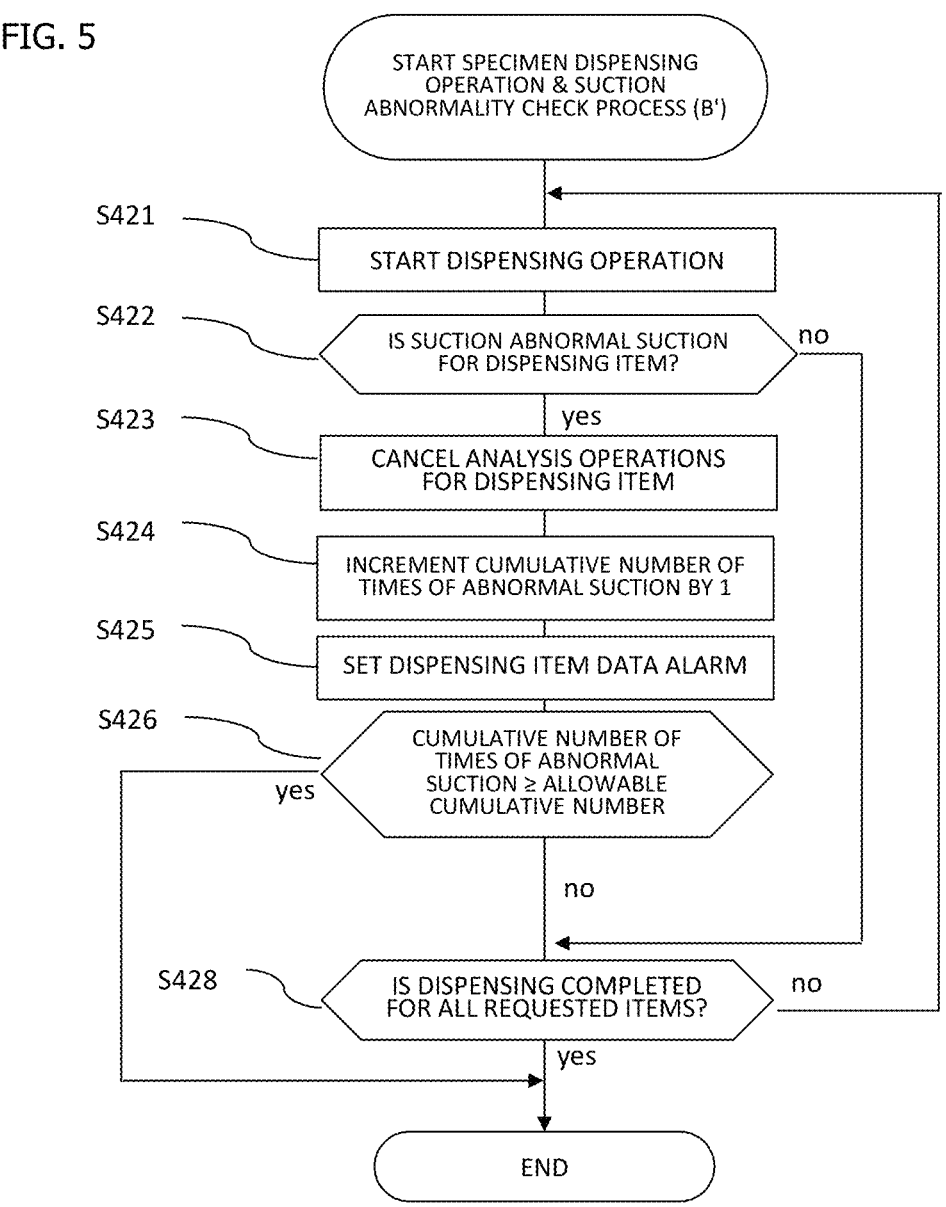
FIG. 5 is a flowchart showing details of Step S406 shown in FIG. 4.

FIG. 5 is a flowchart showing details of Step S406 shown in FIG. 4.

In FIG. 5, a dispensing operation is started for the measurement item requested to the specimen transported to the first unit 110 (Step S421). The abnormality determination section 623 checks whether suction is abnormal suction due to bubbles or air suction (Step S422).

As described above, the abnormality determination section 623 determines whether the suction is the abnormal suction (also referred to as "air suction abnormality") due to the bubbles or the air suction from the change of the internal pressure of the sample probe 16 detected by the pressure sensor 26. Since the sample dispensing mechanism 15 performs the dispensing operation (suction operation) upon misdetection by the liquid level detection mechanism that the surface of the bubbles is the liquid level, the abnormality determination section 623 can determine whether the suction is the normal suction or the abnormal suction by the change of the pressure.

When the abnormality determination section 623 determines that the suction is not the abnormal suction in Step S422, it is checked whether dispensing of the specimen is completed for all requested measurement items to the specimen (Step S428). When an uncompleted measurement item remains among all the requested measurement items in Step S428, the dispensing operation is repeated on the specimen for the next requested measurement item (Step S421).

When the abnormality determination section 623 determines that the suction is the abnormal suction in Step S422, all analysis operations including delivery of the sample to the reaction container 35, subsequent dispensing of the reagent, and the like that are originally planned for the dispensing item (as which the target measurement item is referred to since the dispensing operation is performed for the target measurement item) for which the abnormality determination section 623 determines that the suction is the abnormal suction are cancelled (Step S423). The cumulative number of times of abnormal suction is incremented by 1 (Step S424). In this way, the controller 60 exercises control such that the cumulative number of times of abnormal suction is updated and the updated cumulative number is stored in the storage section 624.

Moreover, a data alarm indicating the abnormal suction due to the bubbles or the air suction is set to the dispensing item for which the abnormality determination section 623 determines that the suction is the abnormal suction (Step S425). In this case, since the suction is the abnormal suction and a normal analysis operation flow is not completed, measurement data is not output.

Next, it is checked whether the updated cumulative number of times of abnormal suction (cumulative number of times of air suction abnormality) is equal to or greater than a predetermined allowable cumulative number (Step S426). The predetermined allowable cumulative number is an allowable cumulative number of times of abnormal suction for the specimen due to the bubbles or the air suction and is set in advance (stored in the storage section 624 in advance). In other words, the allowable cumulative number of times of air suction abnormality (equal to or greater than 2) is stored in the storage section 624 in advance. In addition, the cumulative number of air suction abnormality for each sample determined by the abnormality determination section 623 is stored in this storage section 624. The allowable cumulative number is desirably a value equal to or greater than 2. This is because the bubbles are possibly eliminated by the contact of the sample probe 16 with the bubbles during the suction operation. However, the excessively large allowable cumulative number possibly causes a considerable reduction of throughput; thus, it is necessary to appropriately set the allowable cumulative number. The allowable cumulative number may be fixed to an initial set value or may be a value such that the user can set an arbitrary value in the light of properties of the specimen handled by each facility or an experimental result.

Furthermore, types of the sample contained in each sample container 10 are classified into a patient specimen (patient-derived body fluid or the like), a precision management sample, a standard liquid, and the like. The setting of the allowable cumulative number may vary depending on each of these types.

Moreover, a reason for cumulating the number of times of abnormal suction is that it is supposed that a state of the bubbles present at the surface changes due to elimination, movement or the like of the bubbles. The cumulative number corresponds to the number of times of abnormality determination irrespective of whether the abnormal suction (air suction abnormality) consecutively occurs. Limiting the number of times of abnormal suction to the number of times of consecutive air suction as described in JP-A2004-125780 makes it impossible to deal with the air suction abnormality resulting from the movement of the bubbles. Comparing the allowable number with the number of times of abnormality determination not only for a case of abnormality that occurs consecutively but also for a case of abnormality that occurs un-consecutively makes it possible to appropriately deal with un-consecutively occurring abnormality that is determined after the suction is determined as the normal suction at one time for the same sample. In other words, even when the air suction abnormality does not consecutively occur, the cumulative number of times of air suction abnormality is updated. In addition, the cumulative number is the number incremented without resetting count to zero even if the air suction abnormality occurs consecutively.

FIG. 14 is an explanatory diagram of cases in which the abnormal suction occurs consecutively and un-consecutively on a condition that the allowable cumulative number is 2. Case A is a case in which it is consecutively determined that the suction is the abnormal suction, while Case B is a case in which it is un-consecutively determined that the suction is the abnormal suction and it is determined that the suction is the normal suction between the determinations of the abnormal suction. Managing the number of times by using the cumulative number has the following effects. In Case B in which it is supposed that many bubbles are present at the surface and that the state of the bubbles changes, the cumulative number reaches 2 for Measurement item 3 and a dispensing operation is not performed on the specimen of interest for Measurement item 4 for which suction possibly becomes the abnormal suction again. Managing the number of times only in the case of consecutive abnormal suction possibly results in inefficient analysis. The count is reset to zero once in the case like Case B in which it is determined that the suction is the normal suction at one time and it is then determined that the suction is the abnormal suction. For example, the dispensing operation is continued for up to Measurement item 4. The suction operation is repeated even in a state in which many bubbles are present at the surface. The return of the sample to the user is delayed even when it is preferable that the user take measures. The case in which the allowable cumulative number is 2 has been described. It is noted, however, that delay becomes longer as the allowable cumulative number is larger.

When the abnormality determination section 623 determines that the suction is the abnormal suction for the dispensing item and the cumulative number of times of abnormal suction is smaller than the predetermined allowable cumulative number, it is checked whether dispensing of the specimen is completed for all the requested items to the specimen (Step S428). When an uncompleted requested item to the specimen remains, procedures of the dispensing operation and the following are repeated for the next requested item (Steps S421 to S428). In other words, when the abnormality determination section 623 determines that the bubbles are present at the surface of the liquid that is the specimen, the controller 60 exercises control such that the sample dispensing mechanism 15 repeatedly executes the sample suction operation again and the abnormality determination section 623 determines whether bubbles are present at the surface of the sample.

The specimen-dispensing-operation and suction-abnormality-check process (B') ends when the cumulative number of times of abnormal suction reaches the predetermined allowable cumulative number in Step S428.

The specimen-dispensing-operation and suction-abnormality-check process (B') also ends when the cumulative number of times of abnormal suction is equal to or greater than the allowable cumulative number in Step S426.

A flow after the specimen-dispensing-operation and suction-abnormality-check process (B') will now be described.

When the processing steps S421 to S426 and S428 shown in FIG. 5 end, the operation goes to Step S407 of FIG. 4.

When the cumulative number of times of abnormal suction is equal to or greater than the predetermined allowable cumulative number in Step S407, all analysis requests to the specimen are cancelled (Step S409) and the specimen rack 102 is transported to the specimen collecting section 105 (Step S411). When there is the other specimen planned next, the operation of the suction starts at the other specimen. It is noted that the flow can be configured such that when the cumulative number of times of abnormal suction is equal to or greater than the predetermined allowable cumulative number in Step S407, the operation of the suction of the specimen is prohibited in Step S409 (this applies to Steps S509, S614, S715, and S815 to be described later).

When the cumulative number of times of abnormal suction is smaller than the predetermined allowable cumulative number in Step S407, the operation goes to Step S411, in which the specimen rack 102 is transported to the specimen collecting section 105.

(Case in Which Automatic Re-Test Setting is Enabled)

Next, a case in which the automatic re-test setting is enabled will be described.

The automatic re-test means that a re-test request to the liquid such as the specimen or the reagent (request to test the liquid again) is automatically set when abnormality such as liquid suction abnormality is detected for the dispensing item in the liquid dispensing mechanism that performs the suction of the specimen or the reagent but the cumulative number of times of abnormal suction is smaller than the allowable cumulative number.

Figure 6:
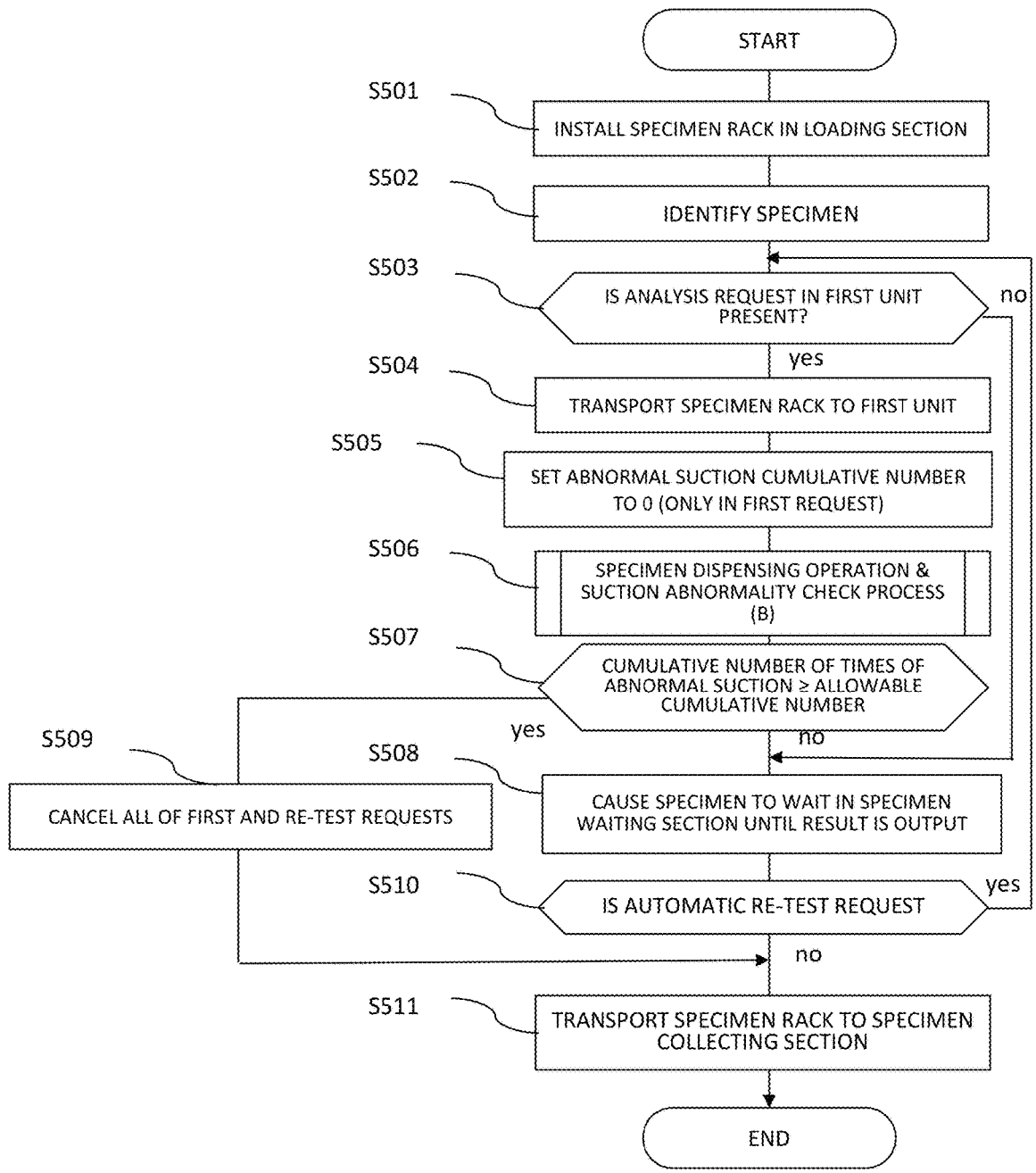
FIG. 6 is a flowchart showing a flow of the abnormal-suction-check and specimen process according to the first embodiment of the present invention in a case in which automatic re-test setting is enabled.

FIG. 6 is a flowchart showing a flow of the abnormal-suction-check and specimen process according to the first embodiment of the present invention in the case in which the automatic re-test setting is enabled. The controller 60 exercises control over the operation shown in FIG. 6.

The flowchart of FIG. 6 is similar to the flowchart of FIG. 4 in basic flow. In other words, Steps S401 to S407, S409, and S411 of FIG. 4 are similar to Steps S501 to S507, S509, and S511 of FIG. 6, and Steps S508 and S510 are added to the flowchart of FIG. 6.

Some of the steps of FIG. 6 will be selected and the selected steps will be described below.

The cumulative number of times of abnormal suction for the specimen transported to the first unit 110 is set to zero (Step S505). It is noted that the cumulative number of times of abnormal suction for the specimen is set to zero only when the specimen is transported to and analyzed by the first unit 110 for the first time. For example, when the specimen is transported to the first unit 110 for the second time for execution of the automatic re-test or the like, resetting of the cumulative number of times of abnormal suction (to zero) for the specimen is not executed.

Following Step S505, a specimen-dispensing-operation and suction-abnormality-check process (B) is executed (Step S506).

Figure 7:
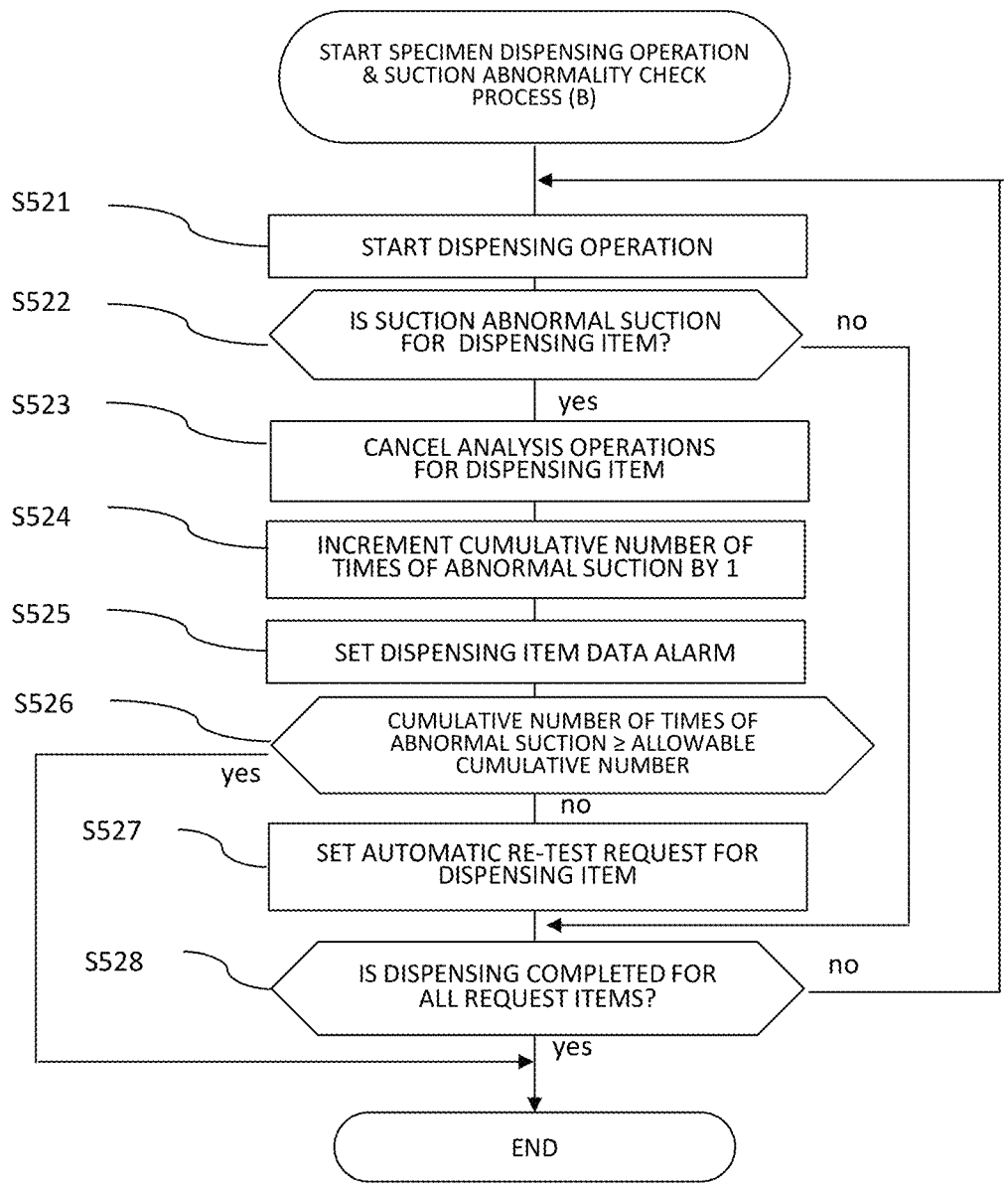
FIG. 7 is a flowchart of a specimen-dispensing-operation and suction-abnormality-check process (B)

The specimen-dispensing-operation and suction-abnormality-check process (B) will now be described in detail. FIG. 7 is a flowchart of the specimen-dispensing-operation and suction-abnormality-check process (B). A basic flow shown in FIG. 7 is similar to the flow of FIG. 5, and the specimen-dispensing-operation and suction-abnormality-check process (B) is similar to the specimen-dispensing-operation and suction-abnormality-check process (B'). In other words, Steps S421 to S426 and S428 of FIG. 5 are similar to Steps S521 to S526 and S528 of FIG. 7, and Step S527 is added to the flowchart of FIG. 7. Since the automatic re-test setting is enabled in the flowchart of FIG. 7, FIG. 7 differs from the example of FIG. 5 only in a part relevant to the setting.

In FIG. 7, a dispensing operation is started for the measurement item requested to the specimen of interest (Step S521). Next, the abnormality determination section 623 checks whether suction is abnormal suction (Step S522). When the abnormality determination section 623 determines that the suction is not the abnormal suction, it is checked whether dispensing of the specimen is completed for all measurement items requested to the specimen (Step S528). When the specimen is not dispensed for all the requested items but an uncompleted measurement item remains in Step S528, the operation returns to Step S521, in which the dispensing operation is repeated for the next requested item.

When the abnormality determination section 623 determines that the suction is the abnormal suction in Step S522, all analysis operations including the delivery of the sample to the reaction container 35, the subsequent dispensing of the reagent, and the like that are originally planned for the dispensing item are cancelled (Step S523). The cumulative number of times of abnormal suction is incremented by 1 (Step S524). In this way, the controller 60 exercises control such that the cumulative number of times of abnormal suction is updated and the updated cumulative number is stored in the storage section 624. Moreover, a data alarm indicating the abnormal suction due to the bubbles or the air suction is set to the dispensing item (Step S525). In this case, since the suction is the abnormal suction and a normal analysis operation flow is not completed, measurement data is not output. Next, it is checked whether the cumulative number of times of abnormal suction is equal to or greater than the predetermined allowable cumulative number (Step S526). The data alarm set in Step S525 is displayed on the display section (output section) of the computer 62 as described later. Alternatively, the data alarm can be output as a voice from the computer 62.

When the abnormality determination section 623 determines that the suction is the abnormal suction for the dispensing item and it is determined in Step S526 that the cumulative number of times of abnormal suction is smaller than the predetermined allowable cumulative number, an automatic re-test request is set for the dispensing item (Step S527). It is then checked whether dispensing of the specimen is completed for all requested measurement items to the specimen (Step S528). When an uncompleted requested item remains in Step S528, the operation returns to Step S521 and procedures of the dispensing operation and the following are repeated for the next requested item (Steps S521 to S528). The specimen-dispensing-operation and suction-abnormality-check process (B) ends when the cumulative number of times of abnormal suction reaches the predetermined allowable cumulative number in Step S526.

After completion of the specimen-dispensing-operation and suction-abnormality-check process (B), the operation goes to Step S507 of FIG. 6. The cumulative number of times of abnormal suction for the specimen is compared with the allowable cumulative number in Step S507. When the cumulative number of times of abnormal suction reaches the predetermined allowable cumulative number, all requests to the specimen are cancelled (Step S509). In addition, the specimen rack 102 is transported to the specimen collecting section 105 (Step S511). When there is the other specimen planned next, the operation of the suction starts at the other specimen.

On the other hand, when the cumulative number of times of abnormal suction is smaller than the predetermined allowable cumulative number in Step S507, the specimen is analyzed and waits in the specimen waiting section 104 until a measurement result is output for the item for which the specimen is automatically re-tested (Step S508).

It is then determined whether there is a measurement item for which the specimen is automatically re-tested (Step S510). When there is a measurement item for which the specimen is automatically re-tested, the specimen is transported again from the specimen waiting section 104 to the first analysis unit 110, where the operation of the suction of the specimen is performed and the specimen is analyzed. Basically, when there is a measurement item for which the specimen is automatically re-tested, the procedures are repeated from Step S503 to Step S510. The procedures during the automatic re-test differ from those in the first test in that the cumulative number of times of abnormal suction is not set to zero in Step S505 during the automatic re-test. The specimen is not unloaded from the system and user's manual bubble check and bubble elimination work is not actually carried out. Owing to this, the request is not the first request unless the specimen is unloaded from the system; thus, information on the cumulative number of times of abnormal suction for the specimen is consecutively cumulated and managed.

Furthermore, the automatic re-test request setting is enabled as described above; thus, if the item for which the specimen is automatically re-tested is the item for which it is determined in the first test that the suction is the abnormal suction due to the bubbles or the air suction, the specimen is analyzed for the item during the automatic re-test.

It is desirable here that the dispensing operation in the first test does not differ from that in the automatic re-test for the item for which it is determined that the suction is the abnormal suction. For example, it is not desirable that the sample is dispensed in a larger amount in the re-test than that in the first test so that the sample probe 16 is immersed in the sample more deeply. The reason is as follows. As a contamination range of the sample probe 16 is wider, it is necessary to make addition, change, and the like of a washing range, washing time, or a washing condition, which possibly causes complication of processing and an increase of processing time.

When all of automatic re-tests are over and dispensing of the specimen is completed for all the requested items to the specimen, the specimen is transported to the specimen collecting section 105 (Step S511).

When the automatic re-test request for the dispensing item is set in Step S527 of FIG. 7, it is then determined that the automatic re-test request is present in Step S510 after Steps S507 and S508 and Steps S503 to S506 are repeated. However, when the suction is not the abnormal suction for the dispensing item in Step S522 of FIG. 7, the automatic re-test request is kept without cumulating the cumulative number of times of abnormal suction. Furthermore, when it is determined that the automatic re-test request is present in Step S510, the process proceeds to Step S501 through Steps S503 to S508, and the flow of FIG. 7 is further executed. In this case, the flow is possibly repeated unnecessarily. Owing to this, when it is determined that the suction is not the abnormal suction in Step S522 of FIG. 7 consecutively by a predetermined number of times, it is possible to avoid unnecessary repetition of a loop by performing a process of cancellation of the setting of the automatic re-test request or the like.

Figure 8:
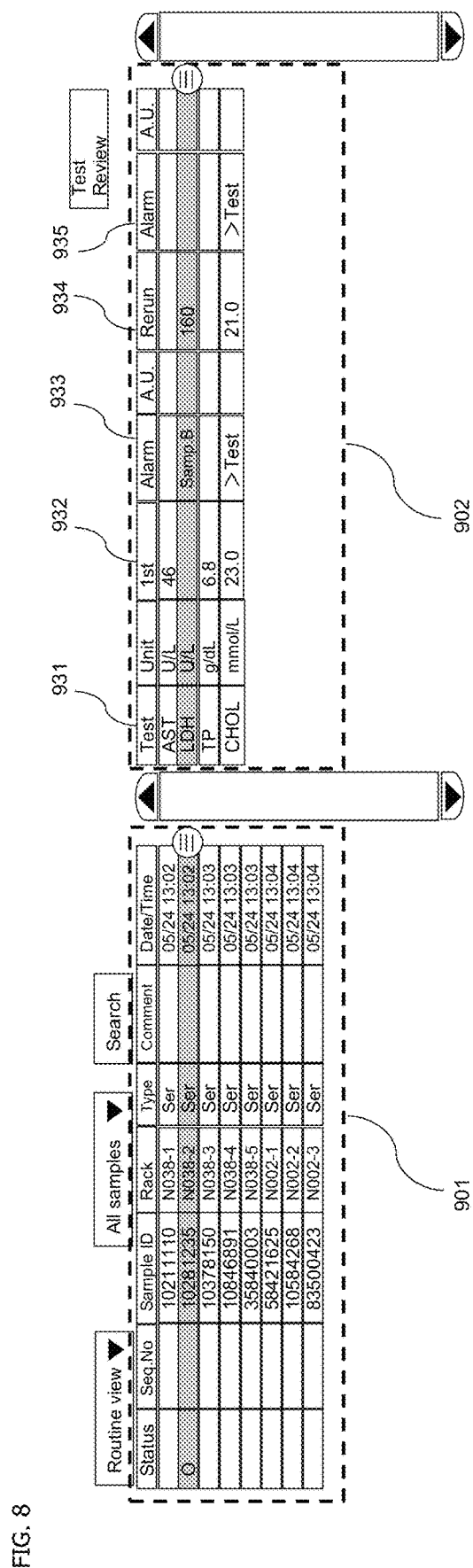
FIG. 8 shows an example of a display screen on which a result of specimen measurement is displayed according to the first embodiment of the present invention.

FIG. 8 shows an example of a display screen on which a result of specimen measurement is displayed according to the first embodiment of the present invention. This display screen is displayed on the display section of the computer 62. The controller 60 exercises control such that a data alarm and an analysis result for every number of times of measurement is displayed on the display section, which is the output section, of the computer 62 for every measurement item.

In FIG. 8, sample IDs, rack numbers, types, comments, and dates and time are displayed in a specimen list display section 901. In addition, an item name display section 931, a first measurement result display section 932, a first measurement result data alarm display section 933, a re-test measurement result display section 934, and a re-test measurement result data alarm display section 935 are displayed in a measurement result display section 902.

The measurement result for the specimen on which a cursor is put in the specimen list display section 901 is displayed in the measurement result display section 902. The example shown in FIG. 8 is a display example in a case of putting a cursor on sample ID 10281235.

For example, in a case in which the item name is LDH in the measurement result display section 902, a first measurement result could not be obtained. Owing to this, no measurement result is displayed in the first measurement result display section 932 and "Samp.B" indicating the abnormal suction of the specimen is displayed in the first measurement result data alarm display section 933. In addition, a re-test measurement result of 160 is displayed in the re-test measurement result display section 934 and no alarm is displayed in the re-test measurement result data alarm display section 935. This is because no abnormality occurred in the re-test.

In this way, the measurement result can be displayed on the display screen of the computer 62 and a measurer can recognize whether abnormality occurred in the first test, whether abnormality occurred in the re-test, and measurement values when the abnormality did not occur.

As described so far, according to the first embodiment of the present invention, even when an internal pressure waveform of the sample probe 16 is abnormal and it is determined that the suction is the abnormal suction during dispensing of the sample, the dispensing operation continues until the cumulative number of times of abnormal suction reaches the allowable cumulative number. When it is not determined that the suction is the abnormal suction, it is possible to obtain the measurement result.

Thus, according to the first embodiment of the present invention, it is possible to realize the automatic analyzer that can make measurements again even in a case in which bubbles are detected but the bubbles are then eliminated in short time, dispense with the need of carrying out cancellation of analysis of the specimen, discharge of the specimen, and user's checking work and bubble elimination measures, and reduce user's work burden. Furthermore, even if the suction is determined to be the normal suction at one time and then the suction is determined to be the abnormal suction, the determination is based on the cumulative number of times of abnormal suction and it is, therefore, possible to appropriately deal with the air suction abnormality resulting from the movement of the bubbles. In other words, even when the abnormal suction does not occur consecutively, the cumulative number of times of air suction abnormality is updated. It is, therefore, possible to realize the automatic analyzer that can suppress inefficiency such as the unnecessarily consecutive repetition of the suction operation even if it is determined that the suction is the normal suction at one time, and the delay of return of the sample to the user even when it is preferable that the user take measures for the abnormality.

In this way, the controller 60 desirably exercises control such that the cumulative number of times of air suction abnormality is updated and the updated cumulative number is stored in the storage section 624 even if the air suction abnormality occurs un-consecutively in a course of the operation of the suction of the liquid by the probe with respect to the number of measurement items for the same sample, such that the operation of the suction planned on the same sample is continued until the updated cumulative number reaches the allowable cumulative number, and such that a request of the measurement items planned to the same sample is cancelled and the operation of the suction is started at another liquid planned next when the updated cumulative number reaches the allowable cumulative number.

Furthermore, since the automatic re-test can be set, the re-test is automatically conducted when it is determined that suction abnormality has occurred and it is not determined that the suction abnormality has occurred in the re-test for a set item. It is, therefore, possible to improve reliability of the test (analysis) for the set item.

Owing to this, when the automatic re-test setting is enabled, it is desirable to set the automatic re-test request for the measurement item for which it is determined that the air suction abnormality has occurred until the updated cumulative number reaches the allowable cumulative number.

Furthermore, the controller 60 exercises control such that when the updated cumulative number reaches the allowable cumulative number, the request planned to the specimen for the measurement item is cancelled and the specimen is transported to the specimen collecting section 105. The user can thereby take measures quickly and reliably.

Second Embodiment

A second embodiment of the present invention will next be described.

The second embodiment of the present invention is an example in which a system (combined system) includes the first unit 110 and the second unit 111 that are the analysis section of the automatic analysis system shown in FIG. 3, and in which the first unit 110 and the second unit 111 each use the same bubble detection method (bubble detection method by the change of the internal pressure of the sample probe 16 using the pressure sensor 26 similar to that according to the first embodiment). In other words, the first and second units 110 and 111 each determine that bubbles are present at the surface of the liquid on the basis of the change of the internal pressure of the probe after the probe contacts the bubbles. The dispensing mechanism for each probe is provided with the liquid level detection mechanism. For example, the first and second units 110 and 111 are both biochemical analysis units, or one of the first and second units 110 and 111 is a biochemical analysis unit and the other is an electrolyte analysis unit.

It is noted that the second embodiment will be described in the case in which the automatic re-test setting is enabled by way of example.

Furthermore, the first unit 110 and the second unit 111 each include the sample dispensing mechanism 15, the reagent disks 41 and 42, the reaction disk 36, the light source 50, the spectral sensor 51, the controller 60, the timing detection section 61, the computer 62, and the like shown in FIG. 1. It is noted, however, that the controller 60, the timing detection section 61, and the computer 62 can be provided commonly to the first and second units 110 and 111.

Figure 9:
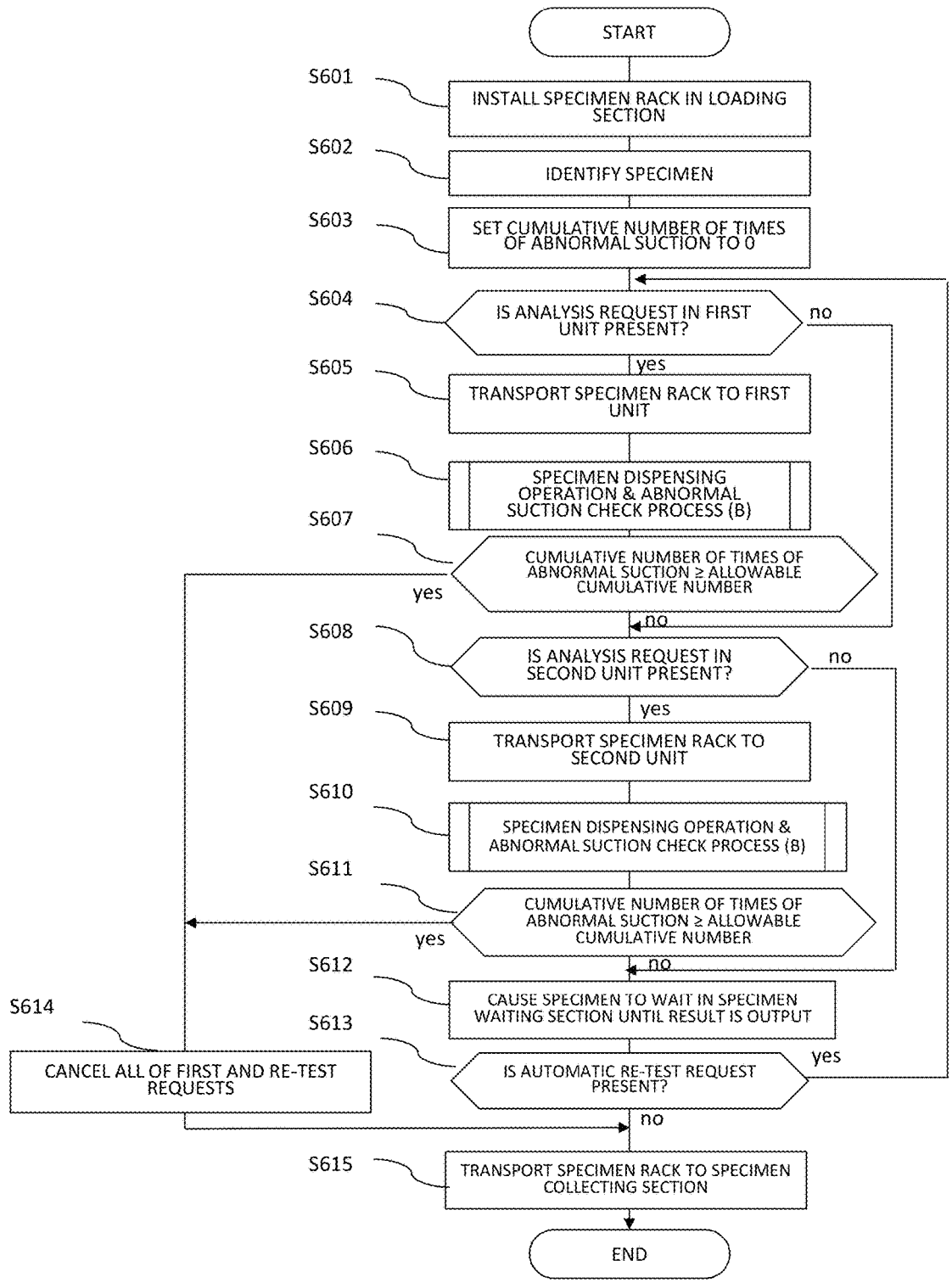
FIG. 9 is a flowchart showing an example of a flow of an abnormal-suction-check and specimen process according to a second embodiment of the present invention.

FIG. 9 is a flowchart showing an example of a flow of the abnormal-suction-check and specimen process according to the second embodiment of the present invention, and the controller 60 exercises operation control over the flow. Since the flowchart of FIG. 9 is similar to that of the first embodiment in basic flow, the flowchart will be described with similar parts simplified. A flow when requests to the same specimen are present for analysis items in both the first unit 110 and the second unit 111 will now be described.

In FIG. 9, the specimen rack 102 is installed in the specimen loading section 101, the specimen identification section 106 identifies the specimen, the cumulative number of times of abnormal suction is set to zero, it is determined whether an analysis request in the first unit 110 is present, and the specimen rack 102 is transported to the first unit 110 when the analysis request is present (Steps S601 to S605).

Next, the specimen-dispensing-operation and abnormal-suction-check process (B) is executed (Step S606). Since the specimen-dispensing-operation and abnormal-suction-check process (B) is similar to that in the process flow of the first embodiment (process flow in FIG. 7), the specimen-dispensing-operation and abnormal-suction-check process (B) will not be described.

After the specimen-dispensing-operation and abnormal-suction-check process (B) in Step S606, the cumulative number of times of abnormal suction is compared with the allowable cumulative number (Step S607). When the cumulative number of times of abnormal suction reaches the predetermined allowable cumulative number in Step S607, requests to the specimen for all the measurement items in the first unit 110 and the second unit 111 are cancelled (Step S614). This is because it is highly likely that the suction is determined as the abnormal suction not only in the first unit 110 but also in the second unit 111 that is the other analysis unit using the same bubble detection method. The cancellation is intended to avoid unnecessary consumption of the samples, the reagents, the time, and the like. Therefore, the cumulative number of times of abnormal suction is managed by adding up the cumulative number of times of abnormal suction in the first unit 110 and that in the second unit 111.

Moreover, the cumulative number of times of abnormal suction is reset to zero in Step S603 before the specimen rack 102 is transported to the analysis unit (first unit 110 or second unit 111). However, reset timing is not limited to timing before the transport of the specimen rack 102 if the cumulative number of times of abnormal suction can be managed by adding up the cumulative number of times of abnormal suction in the first unit 110 and that in the second unit 111.

In this alternative, it is desirable that the cumulative number of times of abnormal suction determined as the air suction abnormality by the determination section of each of the first unit 110 and the second unit 111 is added up for the same specimen to update the cumulative number of times of air suction abnormality, and the updated cumulative number is stored in the storage section 624, and the operation of the suction planned for the specimen is continued until the updated added cumulative number reaches the allowable cumulative number.

After the process in Step S614, the specimen rack 102 is transported to the specimen collecting section 105 (Step S615).

After the specimen is dispensed for all the first requested items in the first unit 110, the cumulative number of times of abnormal suction is compared with the allowable cumulative number in Step S607. When the cumulative number of times of abnormal suction does not reach the allowable cumulative number, it is checked whether a request is present for the measurement items in the second unit 111 (Step S608). When the request is present for the measurement items in the second unit 111 in Step S608, the specimen rack 102 is transported to the second unit 111 (Step S609). In this case, the cumulative number of times of abnormal suction in the first unit 110 is carried over; thus, the cumulative number of times of abnormal suction is not reset (to zero). Next, the specimen-dispensing-operation and abnormal-suction-check process (B) is executed in the second unit 111 (Step S610).

After end of the process (B), when the cumulative number of times of abnormal suction is equal to or greater than the allowable cumulative number in Step S611, all of the first and re-test requests are cancelled and the specimen rack 102 is transported to the specimen collecting section 105 (Steps S614 and S615).

When the cumulative number of times of abnormal suction for the specimen is smaller than the allowable cumulative number in Step S611, and dispensing of the specimen is completed for the first requested items in the first unit 110 and the second unit 111, then the specimen is caused to wait in the specimen waiting section 104 until a measurement result is output for the items for which the specimen is dispensed and automatically re-tested (Step S612).

Next, when an automatic re-test request is present in response to the output result, it is checked whether an analysis request in the first unit 110 is present (Steps S613 and S604). When the automatic re-test request in the first unit 110 is present, then the specimen rack 102 is transported again to the first unit 110 (Step S605), and the specimen-dispensing-operation and abnormal-suction-check process (B) is executed therein (Step S606). When there is an item for which it is determined that the suction is the abnormal suction due to the bubbles or the air suction during the first dispensing in the first unit 110, measurement therefor is executed as an automatic re-test requested item during this process (B).

After completion of dispensing for the automatic re-test requested item in the first unit 110, the cumulative number of times of abnormal suction is compared with the allowable cumulative number (Step S607). When the cumulative number of times of abnormal suction is smaller than the allowable cumulative number and an automatic re-test request in the second unit 111 is present, the specimen rack 102 is then transported to the second unit 111 (Step S609).

The specimen-dispensing-operation and abnormal-suction-check process (B) is executed in the second unit 111 (Step S610).

When there is an item for which it is determined that the suction is the abnormal suction due to the bubbles or the air suction during the first dispensing in the second unit 111, measurement therefor is executed as an automatic re-test requested item during this process (B).

Next, it is determined whether the cumulative number of times of abnormal suction is equal to or greater than the allowable cumulative number in Step S611. When the cumulative number of times of abnormal suction is smaller than the allowable cumulative number, Steps S612 and S613 are executed.

When dispensing is completed for all the automatic re-test requested items in the first unit 110 and the second unit 111, the specimen rack 102 is transported to the specimen collecting section 105 (Step S615).

The second embodiment of the present invention in which the system includes the two analysis units 110 and 111 and in which the two analysis units 110 and 111 use the same bubble detection method can attain similar effects to those of the first embodiment.

Third Embodiment

A third embodiment of the present invention will next be described.

The third embodiment of the present invention is an example in which a system (combined system) includes the first unit 110 and the second unit 111 that are the analysis section of the automatic analysis system shown in FIG. 3, and in which the first unit 110 and the second unit 111 use different bubble detection methods (the bubble detection method by the change of the internal pressure of the sample probe 16 using the pressure sensor 26 similar to that according to the first embodiment and the bubble detection method by picking up an image of the liquid level by an imaging section). In other words, the second unit 111 determines that bubbles are present at the surface of the liquid in a non-contact manner. For example, one of the first and second units 110 and 111 is a biochemical analysis unit and the other is an immunoanalysis unit.

It is noted that the third embodiment will be described in the case in which the automatic re-test setting is enabled by way of example.

Figure 10:
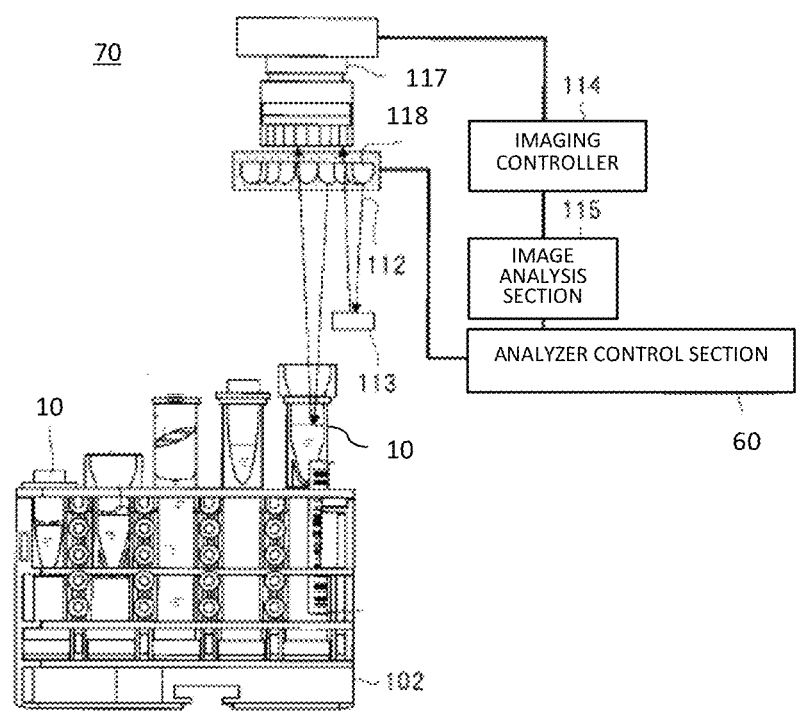
FIG. 10 shows an imaging section that picks up an image of a liquid level of a sample contained in a specimen container.

FIG. 10 shows an imaging apparatus (non-contact sensor) 70 that picks up the image of the liquid level of the sample contained in the specimen container 10 mounted in the specimen rack 102 transported by the specimen transport section 121 of the second unit 111. This imaging apparatus 70 is disposed at a position proximate to the specimen transport section 121.

Illumination light 112 generated from an illumination section 118 is reflected by the liquid level of the sample contained in the specimen container 10 and incident on an imaging section 117, and the imaging section 117 picks up the image of the liquid level of the sample. An imaging controller 114 exercises operation control over the imaging section 117, and an image analysis section 115 determines whether bubbles are present at the surface. When the image analysis section 115 detects bubbles, the apparatus control section (controller) 60 notifies the computer 62 of detection of the bubbles so that a data alarm can be displayed in a measurement result of the specimen. A system alarm can be generated as an alternative to or in addition to the data alarm to enable the user to be notified of generation of the bubbles.

The imaging apparatus 70 picks up the image of the liquid level per specimen container 10 mounted in the specimen rack 102 and it is determined whether bubbles are generated at the surface of each specimen.

Luminance of the illumination light 112 generated from the illumination section 118 can be adjusted using reflected light from a luminance correction structure 113.

Figure 11:
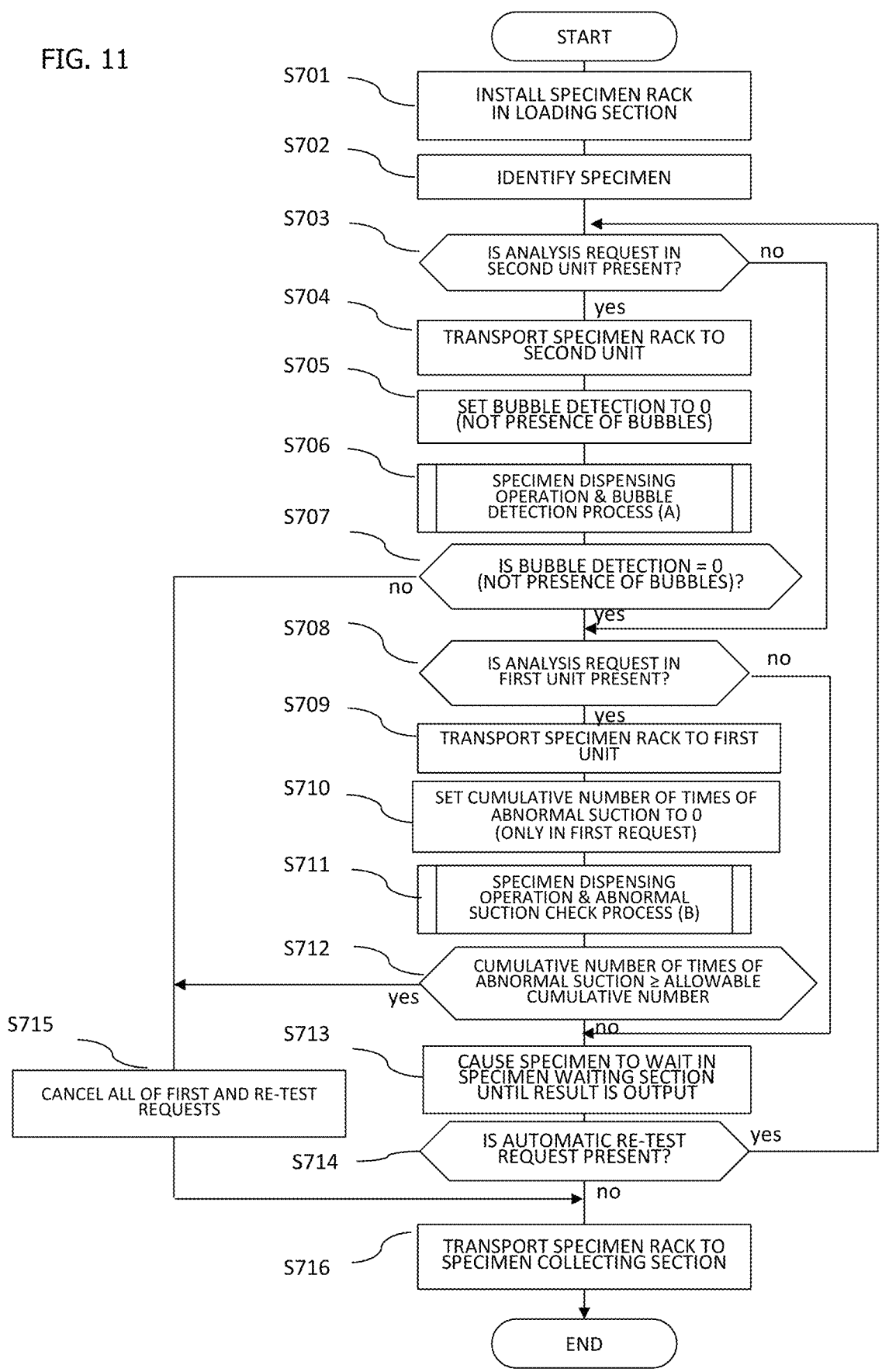
FIG. 11 is an operation flowchart showing an example of specimen handling in a combined system according to a third embodiment of the present invention.

FIG. 11 is an operation flowchart showing an example of specimen handling in the combined system according to the third embodiment of the present invention, and the controller 60 exercises operation control over a flow.

A flow when requests to the same specimen are present for analysis items in both the first unit 110 and the second unit 111 will be described below. Furthermore, in the third embodiment, the first unit 110 uses the bubble detection method of determining whether suction is abnormal suction due to the bubbles or the air suction by the pressure waveform during the suction. On the other hand, the second unit 111 uses the bubble detection method of determining the liquid level by the image of the liquid level or the like before the suction of the specimen in a manner of non-contact with a suction target.

Moreover, when items for measurement in the first unit 110 and those for measurement in the second unit 111 are mixed for the same specimen held in the specimen rack 102, the specimen rack 102 may be transported first to any of the first unit 110 and the second unit 111, that is, the measurement may be started first at any of the analysis units 110 and 111. The specimen rack 102 may be transported first to the analysis unit 110 or 111 that measures high sensitivity measurement items in the light of an influence of specimen carry-over or may be transported first to the analysis unit 110 or 112 having a lighter load by comparing a load of the analysis unit 110 with that of the analysis unit 111.

The operation flow shown in FIG. 11 illustrates an example in which the specimen rack 102 is transported to the first unit 110 and analysis is executed in the first unit 110 after analysis in the second unit 111.

In FIG. 11, when an analysis request in the second unit 111 is present, the specimen rack 102 installed in the specimen loading section 101 is transported to a predetermined suction position in the second unit 111 (Steps S701 to S704). In addition, non-occurrence of bubble detection is set to the specimen (Step S705) and a specimen-dispensing-operation and bubble-detection process (A) is executed. The specimen-dispensing-operation and bubble-detection process (A) will now be described in detail.

Figure 12:
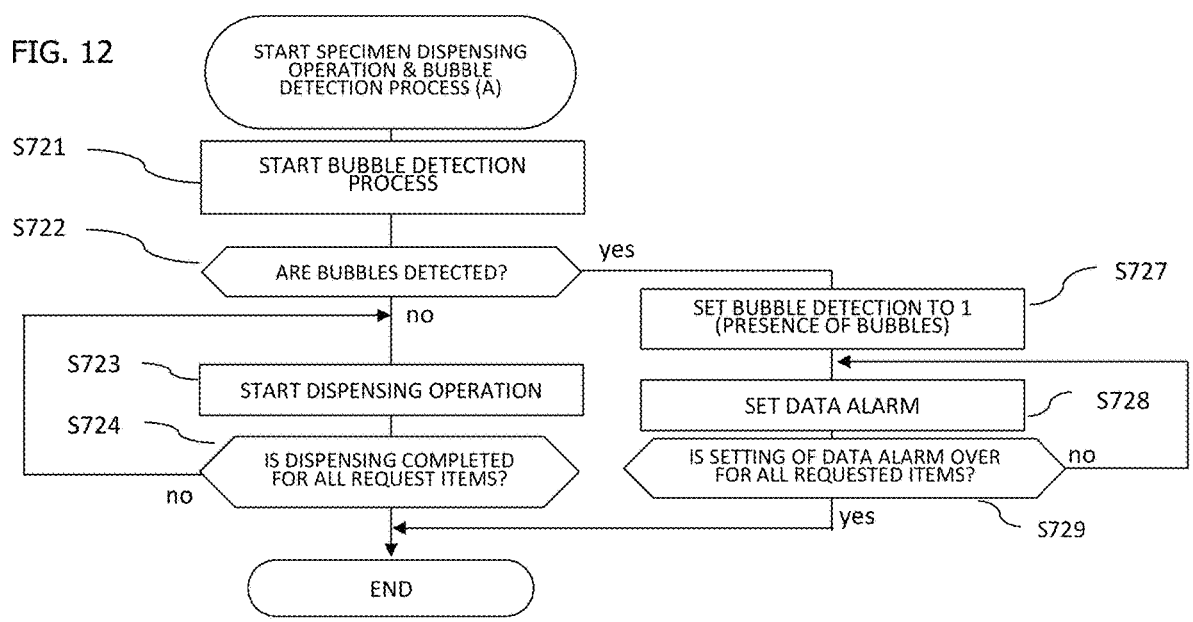
FIG. 12 is an operation flowchart of a specimen-dispensing-operation and bubble-detection process (A)

FIG. 12 is an operation flowchart of the specimen-dispensing-operation and bubble-detection process (A).

In FIG. 12, the imaging section 117 picks up the image of the liquid level of the specimen before the suction of the specimen to execute a bubble detection process at the surface of the specimen (Step S721). When it is determined that bubbles are present on the specimen in Step S721, occurrence of bubble detection (bubble detection=1) is set (Step S727). In addition, a data alarm is set to each of all items for the specimen (Steps S728 and S729).

When non-occurrence of bubble detection (bubble detection=0) is determined in Step S722, the dispensing operation is executed (Step S723). The dispensing operation is repeated until the specimen is dispensed for all the analysis items requested in the second unit 111 (Steps S723 and S724).

A flow after the specimen-dispensing-operation and bubble-detection process (A) will now be described.

In FIG. 11, it is checked whether bubble detection does not occur (Step S707). When occurrence of bubble detection (bubble detection=1) is determined in Step S707, the request to the specimen for all the measurement items is cancelled (Step S715). This is because it is supposed that the suction is determined as the abnormal suction during the suction not only in the second unit 111 but also in the first unit 110 when it is determined whether the bubbles are present by the image of the liquid level of the specimen. However, it may be determined whether to continue analysis by transporting the specimen rack 102 to the first unit 110 in response to a type of the image, for example, the image of the liquid level indicating few bubbles or the imaging indicating a thin liquid membrane in the second unit 111.

When non-occurrence of bubble detection (bubble detection=0) is determined in Step S707, the analysis in the second unit 111 ends and it is then checked whether an analysis request in the first unit 110 is present (Step S708). When the analysis request in the first unit 110 is present in Step S708, the specimen rack 102 is transported to a predetermined suction position in the first unit 110 (Step S709). The cumulative number of times of abnormal suction is then set to zero (Step S710). It is noted, however, the cumulative number of times of abnormal suction is set to zero only in the first request in Step S710.

Next, the specimen-dispensing-operation and abnormal-suction-check process (B) is executed (Step S711). Since the specimen-dispensing-operation and abnormal-suction-check process (B) in Step S711 is similar to that shown in FIG. 7, the process (B) will not be described in detail.

Next, when it is determined that the suction is the abnormal suction and the cumulative number of times of abnormal suction reaches the allowable cumulative number, all the requested items to the specimen are cancelled (Steps S711 and S715). The data alarm set when it is determined that the suction is the abnormal suction due to the bubbles or the air suction may be either distinguished from or the same as the data alarm set in the second unit 111 and that in the first unit 110. It is, however, desirable that the data alarm set when it is determined that the suction is the abnormal suction due to the bubbles or the air suction is distinguished from that when clogging occurs.

When dispensing of the specimen is completed for all the first requested items in the first unit 110 and the second unit 111, the specimen is caused to wait in the specimen waiting section 104 until a measurement result is output for the items for which the specimen is dispensed and automatically re-tested (Step S713). When an automatic re-test request is present in response to the output result, it is checked whether an analysis request in the second unit 111 is present (Step S714). When the automatic re-test request is present, analysis is executed in the second unit 111 (Steps S703 to S707).

When dispensing is completed for all the automatic re-test requested items in the second unit 111, it is checked whether an analysis request in the first unit 110 is present (Step S708). When the automatic re-test request is present, analysis is executed in the first unit 110 (Steps S709 to S712). After execution of the dispensing operation in response to the automatic re-test request in the first unit 110, the specimen rack 102 is transported to the specimen collecting section 105 (Steps S713 to S716).

While the above example shown in FIG. 11 is an example of starting analysis at the second unit 111, an example shown below is an example of starting analysis at the first unit 110. The other conditions in the example below are similar to those shown in FIG. 11.

Figure 13:
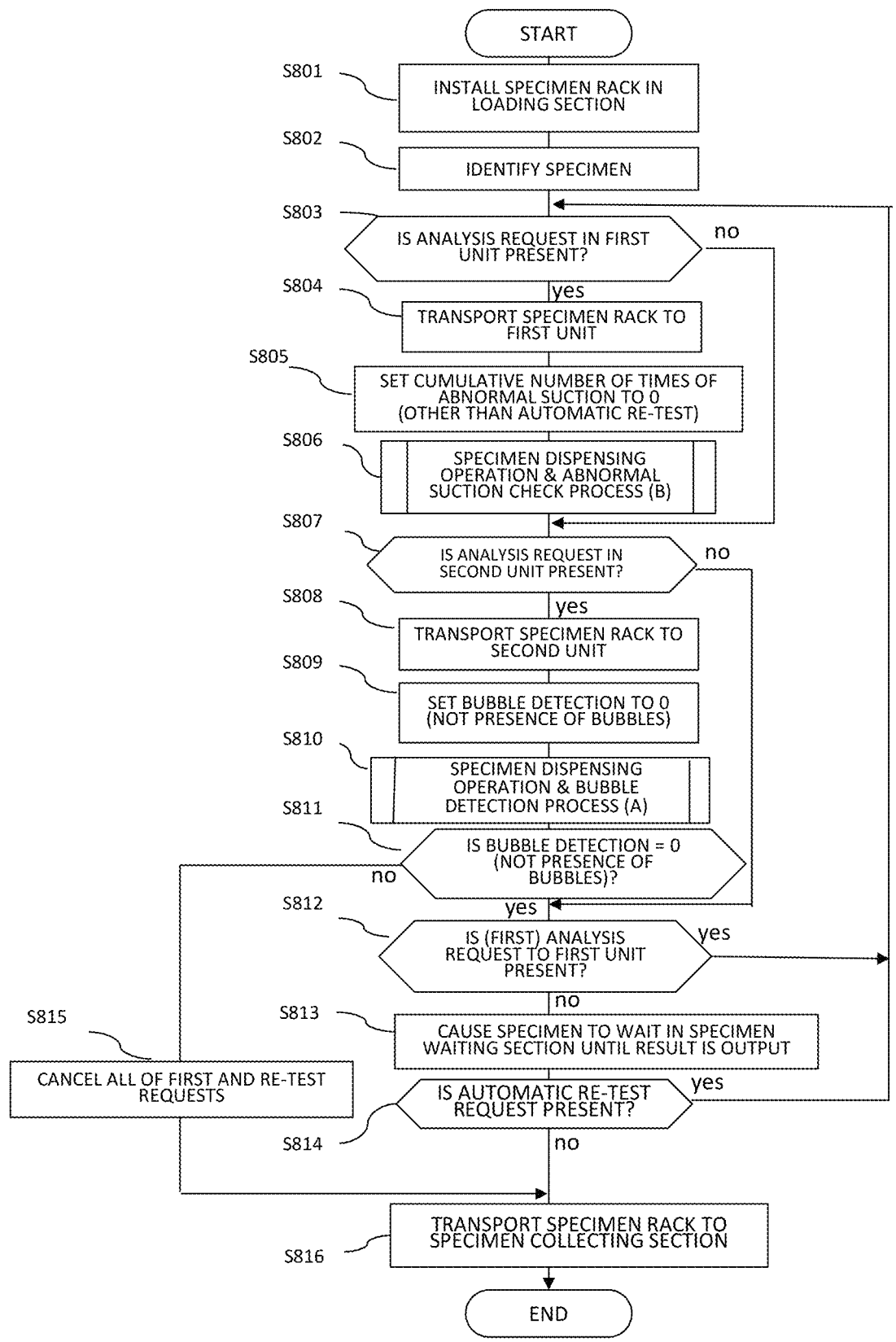
FIG. 13 is an operation flowchart in an example of starting analysis from a first unit.

FIG. 13 is an operation flowchart in the example of starting analysis at the first unit 110, and the controller 60 exercises operation control over a flow.

Since a basic flow of FIG. 13 is similar to the flow shown in FIG. 11, some of the steps of FIG. 13 will be selected and the selected steps will be described.

In FIG. 13, when an analysis request in the first unit 110 is present, the specimen rack 102 installed in the specimen loading section 101 is transported to the first unit 110 (Steps S801 to S804). At a time of execution in response to the first request, the cumulative number of times of abnormal suction is set to zero (Step S805), and the specimen-dispensing-operation and abnormal-suction-check process (B) is executed (Step S806). Since contents of the specimen-dispensing-operation and abnormal-suction-check process (B) are exactly the same as those in the flowchart shown in FIG. 7, the process (B) will not be described.

A flow after the specimen-dispensing-operation and suction-abnormality-check process (B) will now be described.

Even when the specimen is dispensed for all the first requested items in the first unit 110 and the cumulative number of times of abnormal suction is equal to or greater than the predetermined allowable cumulative number, it is checked whether a request is present for the measurement items in the second unit 111 (Step S807). In other words, it is checked whether a measurement request (analysis request) in the second unit 111 is present irrespectively of the cumulative number of times of abnormal suction in the first unit 110.

When the request is present in Step S807, the specimen rack 102 is transported to the second unit 111 (Step S808). In other words, when the analysis request in the second unit 111 is present, a determination result of the bubble detection method during the suction of the specimen in the first unit 110 is not taken into account. This is because the bubble detection method used in the second unit 111 includes the non-contact sensor that can discriminate whether bubbles are present in relatively short time by the picked-up image of the liquid level of the specimen in the manner of non-contact with the specimen.

In the second unit 111, the specimen dispensing operation is performed and a bubble detection process is performed (Steps S808 to S810).

When occurrence of bubble detection is determined by the bubble discrimination method in the second unit 111 (Step S811), the request to the specimen for all the measurement items is cancelled and the specimen is collected in the specimen collecting section 105 (Steps S815 and S816). In other words, when it is determined that bubbles are present in the second unit 111, the request for the measurement items planned in the second unit 111 is cancelled irrespectively of the cumulative number of times of air suction abnormality in the first unit 110.

When non-occurrence of bubble detection is determined by the discrimination method in the second unit 111 (Step S811), it is checked whether a request is present for the first measurement items in the first unit 110 (Step S812). At this time, when there is the first request in response to which dispensing is not executed since the cumulative number of times of abnormal suction reaches the allowable cumulative number in the first unit 110, the specimen is transported to the first unit 110 (Steps S803 and S804). This is because it is supposed that the bubbles are eliminated since non-occurrence of bubble detection is determined in the second unit 111 after the dispensing operation in the first unit 110.

Furthermore, since non-occurrence of bubble detection is determined by the bubble detection method in the second unit 111, the cumulative number of times of abnormal suction is set to zero for the specimen transported to the first unit 110 (Step S805). In other words, the cumulative number of times of abnormal suction in the first unit 110 before bubble detection determination by the second unit 111 is not carried over.

When the dispensing operations in response to the requests for the first measurement items are all completed in the first unit 110 and the second unit 111, the specimen waits in the specimen waiting section 104 until a result is output (Step S813). When an automatic re-test request is present in response to the output result, it is checked whether an analysis request in the first unit 110 is present (Step S803). When the request is present in the first unit 110, the specimen rack 102 is transported again to the first unit 110 (Step S804). Subsequently, the specimen-dispensing-operation and abnormal-suction-check process (B) is executed (Step S805). At this time, the cumulative number of times of abnormal suction is not reset before execution of Step S806 in a process flow during the automatic re-test.

After execution of the dispensing operation in response to the automatic re-test request in the first unit 110, it is checked whether an analysis request in the second unit 111 is present (Steps S806 and S807). When the automatic re-test request is present, analysis is executed in the second unit 111 (Steps S809 and S810). A flow during the automatic re-test is similar to a flow during the first measurement.

After execution of the dispensing operation in response to the automatic re-test request in the second unit 111, the specimen rack 102 is transported to the specimen collecting section 105 (Steps S811 to S816).

The third embodiment of the present invention in which the system includes the two analysis units 110 and 111 and in which the two analysis units 110 and 111 use the different bubble detection methods can attain similar effects to those of the first embodiment.

While it has been described that the analysis units are the first unit 110 and the second unit 111 in the examples shown in the second and third embodiments, the present invention is also applicable to an analysis system that is a combination of three or more analysis units.

Moreover, while the bubble detection method according to the first embodiment is the detection method by the change of the pressure of the sample probe 16, the bubble detection method by picking up the liquid level with the imaging section can be used as an alternative to the detection method by the change of the pressure in the first embodiment.

Furthermore, it is possible to detect that bubbles are present at the surface by a change of an electrostatic capacitance between the sample probe 16 and the reaction container 35 as an alternative to the detection method by the change of the pressure.

Moreover, the examples described above relate to the detection of bubbles at the surface of the sample contained in the sample container 10. However, the present invention is also applicable to the detection of bubbles at the surface of each reagent contained in the reagent container 40. The reagent dispensing mechanism 20 or 21 has a similar configuration as that of the sample dispensing mechanism 15 shown in FIG. 2.

Owing to this, in the present application, the sample (specimen) and the reagent can be generically referred to as "liquids," and the liquid dispensing mechanisms that perform the suction and delivery of the liquids include both the sample dispensing mechanism 15 and the reagent dispensing mechanism 20 or 21. Furthermore, the specimen collecting section 105 may include a reagent collecting section, and the specimen collecting section 105 and the reagent collecting section can be generically referred to as "liquid collecting sections." Moreover, in a case, for example, in which the reagent collecting section is not provided for the reagent, dispensing of the reagent from the reagent container 40 may be cancelled without collecting the reagent container 40 but with the reagent container 40 kept installed in the reagent disk 41 or 42.

DESCRIPTION OF REFERENCE CHARACTERS

10: Sample container
12: Sample disk
15: Sample dispensing mechanism
16: Sample probe
20: First reagent dispensing mechanism
21: Second reagent dispensing mechanism
24: Dispensing channel
25: Proportioning pump
26: Pressure sensor
30: Stirring device
35: Reaction container
36: Reaction disk
40: Reagent container
41: First reagent disk
42: Second reagent disk
45: Container washing mechanism
50: Light source
51: Spectral sensor
60: Controller
61: Timing detection section
62: Computer
66: Plunger
67: Driving mechanism
68: Valve
69: Pump
70: Imaging apparatus
79: System liquid
80: Segmental air
8: Suction liquid
100: Automatic analyzer
101: Specimen loading section
102: Specimen rack
103: Transport line
104: Specimen waiting section
105: Specimen collecting section
106: Specimen identification section
107: Lead-in line
108: Return transport line
110: First unit
111: Second unit
112: Illumination light
113: Luminance correction structure
114: Imaging controller
115: Image analysis section
117: Imaging section
118: Illumination section
120, 121: Specimen transport section
621: AD converter
622: Data extraction section
623: Abnormality determination section
624: Storage section
901: Specimen list display section
902: Measurement result display section
931: Item name display section
932: Measurement result display section
933: First measurement result data alarm display section
934: Re-test measurement result display section
935: Re-test measurement result data alarm display section

What is claimed is:

1. An automatic analyzer comprising:
a liquid dispensing mechanism that sucks a sample or a reagent that is a liquid contained in a container;
a pressure sensor that measures a change of a pressure in a probe provided at the liquid dispensing mechanism;
an analysis section that analyzes the sample;
a controller that controls the liquid dispensing mechanism to perform suction operations comprising individual suctions, and the analysis section to perform a sample analysis operation,
wherein the controller is configured to, for each suction operation planned:
(a) store an initial cumulative number of determined air suction abnormalities per liquid and a predetermined allowable cumulative number of air suction abnormalities, the predetermined allowable cumulative number being equal to or greater than 2;
(b) determine whether suction by the probe is liquid suction that is normal suction or air suction that is abnormal suction on the basis of the change of the pressure measured by the pressure sensor;
(c) update the stored cumulative number of the air suction abnormalities in the event an abnormal suction has been determined in step b) and store the updated cumulative number even if the air suction abnormalities are not consecutive in a course of the suction operation of the liquid by the probe with respect to a number of measurement items for the same liquid;
(d) repeat steps (b)-(c) for each individual suction in the suction operation without washing the liquid dispensing mechanism until the updated cumulative number reaches the predetermined allowable cumulative number; and
(e) cancel requests of the measurement items planned for the liquid and cause another suction operation to be performed on another liquid planned next upon determining the updated cumulative number reaches the predetermined allowable cumulative number.

2. The automatic analyzer according to claim 1,
wherein the controller is configured to set an automatic re-test request based on whether automatic re-test setting is enabled by an operator, and
set the automatic re-test request to a measurement item for which it is determined to have an air suction abnormality before the updated cumulative number reaches the allowable cumulative number when the automatic re-test setting is enabled.

3. The automatic analyzer according to claim 1,
wherein the analysis section includes a first analysis unit and a second analysis unit, and
wherein the controller is further configured to:
add up and update the cumulative number of the air suction abnormalities of the same liquid each determined to have an air suction abnormality for each of the first analysis unit and the second analysis unit, and store the updated cumulative number, and
perform the suction operation planned on the liquid until the updated cumulative number reaches the allowable cumulative number.

4. The automatic analyzer according to claim 3,
wherein each of the first analysis unit and the second analysis unit determines that bubbles are present at the surface of the liquid on the basis of the change of the pressure in the probe after the probe contacts the bubbles.

5. The automatic analyzer according to claim 1,
wherein the analysis section includes a first analysis unit and a second analysis unit,
wherein the first analysis unit determines that bubbles are present on a liquid level of the liquid on the basis of the change of the pressure in the probe after the probe contacts the bubbles,
wherein the second analysis unit determines that the bubbles are present at the surface of the liquid in a non-contact manner, and
wherein the controller cancels measurement item requests planned to the second analysis unit based on the determination of bubbles present at the surface of the liquid by the second analysis unit irrespectively of the cumulative number when determining that the bubbles are present.

6. The automatic analyzer according to claim 1,
wherein the liquid is a specimen, and the automatic analyzer further includes a specimen collecting section, and
wherein the controller is configured to cancel measurement item requests planned for the specimen and cause the specimen to be transported to the specimen collecting section when the updated cumulative number reaches the predetermined allowable cumulative number.

* * * * *